(12) United States Patent
Berkowitz et al.

(10) Patent No.: US 10,081,102 B1
(45) Date of Patent: Sep. 25, 2018

(54) ANTAGONISTIC OUTPUT ACTUATION

(71) Applicant: X Development LLC, Mountain View, CA (US)

(72) Inventors: Ben Berkowitz, San Francisco, CA (US); Jeffrey Bingham, San Francisco, CA (US); Seth Gilbertson, Dublin, CA (US)

(73) Assignee: X Development LLC, Mountain View, CA (US)

( * ) Notice: Subject to any disclaimer, the term of this patent is extended or adjusted under 35 U.S.C. 154(b) by 265 days.

(21) Appl. No.: 15/171,675

(22) Filed: Jun. 2, 2016

(51) Int. Cl.
| F16H 55/18 | (2006.01) |
| B25J 9/10 | (2006.01) |
| F16H 37/06 | (2006.01) |
| F16H 57/12 | (2006.01) |
| B25J 9/12 | (2006.01) |

(52) U.S. Cl.
CPC .............. *B25J 9/103* (2013.01); *B25J 9/126* (2013.01); *F16H 37/06* (2013.01); *F16H 55/18* (2013.01); *F16H 57/12* (2013.01); *F16H 2057/121* (2013.01); *F16H 2057/123* (2013.01)

(58) Field of Classification Search
CPC .......... B25J 9/103; F16H 37/06; F16H 55/18; F16H 2057/121
See application file for complete search history.

(56) References Cited

U.S. PATENT DOCUMENTS

| 8,511,192 B2 | 8/2013 | Hirtt et al. |
| 8,616,088 B2 | 12/2013 | Teng et al. |
| 8,686,680 B2 | 4/2014 | Deegan |
| 2013/0106336 A1* | 5/2013 | Sonoda ................ G05B 19/404 318/624 |

FOREIGN PATENT DOCUMENTS

| EP | 2740970 | 6/2014 |
| WO | WO 2014134688 | 9/2014 |

* cited by examiner

*Primary Examiner* — Muhammad S Islam
(74) *Attorney, Agent, or Firm* — McDonnell Boehnen Hulbert & Berghoff LLP

(57) ABSTRACT

An example system includes a transmission having a first plurality of gears and an extent of backlash. The system also includes a first motor connected to an input shaft of the transmission and a second motor connected to an output shaft of the transmission through a second plurality of gears. A first gear ratio of a first plurality of gears is greater than a second gear ratio of the second plurality of gears. The system may receive a command to change a direction of rotation of the output shaft from a first direction to a second direction. In response to the received command, the first motor may drive the transmission through a first portion of the extent of backlash deadband. The second motor may drive the transmission through a second portion of the extent of backlash deadband. The second portion may be greater than the first portion.

20 Claims, 12 Drawing Sheets

ANTAGONISTIC OUTPUT ACTUATION

BACKGROUND

Mechanical elements of electro-mechanical systems are often driven by motors connected to the mechanical elements through gearboxes. A gearbox can be useful in transforming a low-torque, high-speed rotation of a motor at the gearbox input into a high-torque, low-speed rotation at the gearbox output. However, in applications where precise, bidirectional motion of the mechanical elements is required, backlash of the gearbox can limit the performance of feedback control systems used to achieve the desired level of precision in controlling the mechanical elements. In particular, in low-cost robotic systems constructed with high/wide tolerance parts, large amounts of gearbox backlash can prevent the low-cost robotic systems from being used for applications requiring a high degree of precision and control over the mechanical elements of the robotic system.

SUMMARY

A system for managing backlash of a transmission or gear train may include a transmission and two motors. A first motor may be connected to an input of the transmission and a second motor may be connected to an output of the transmission. The first motor may be configured to drive a load on the output of the transmission. The second motor may be configured to drive the transmission through an extent of backlash of the transmission to bias the transmission to the first motor, thereby allowing the first motor to drive the load on the output of the transmission. The second motor may also assist in driving the load on the output of the transmission. A first gear ratio of the transmission may be larger than a gear ratio of a second plurality of gears connecting the second motor to the output of the transmission. Thus, the second motor may drive the transmission through the extent of backlash faster than the first motor.

In one example, a system is provided that includes a transmission having an input shaft, an output shaft, and a first plurality of gears. The first plurality of gears is configured to transfer motion of the input shaft to the output shaft. Additionally, the transmission has an extent of backlash deadband. The system also includes a first motor connected to the input shaft of the transmission and a second motor connected to the output shaft of the transmission. The second motor is connected to the output shaft through a second plurality of gears. A first gear ratio of the first plurality of gears is greater than a second gear ratio of the second plurality of gears. The system additionally includes a control system configured to receive a command to change a direction of rotation of the output shaft from a first direction to a second direction opposite to the first direction. In response to the received command, the control system provides instructions to drive the transmission through a first portion of the extent of backlash deadband by driving the input shaft with the first motor to drive the output shaft in the second direction through the first gear ratio. The control system also provides instructions to drive the transmission through a second portion of the extent of backlash deadband by driving the output shaft in the second direction through the second gear ratio with the second motor to bias the transmission to the first motor. The second portion is greater than the first portion.

In another example, a method is provided including receiving a command to change a direction of rotation of an output shaft of a transmission from a first direction to a second direction opposite to the first direction. The transmission comprises an input shaft, the output shaft, and a first plurality of gears having a first gear ratio. The first plurality of gears is configured to transfer motion of the input shaft to the output shaft. The transmission has an extent of backlash deadband. The method also includes, in response to the received command, driving the transmission through a first portion of the extent of backlash deadband by driving the input shaft with a first motor to drive the output shaft in the second direction through the first gear ratio. The first motor is connected to the input shaft. The method further includes driving the transmission through a second portion of the extent of backlash deadband by driving the output shaft in the second direction through a second gear ratio with a second motor to bias the transmission to the first motor. The second motor is connected to the output shaft of the transmission through a second plurality of gears having the second gear ratio. The second gear ratio is smaller than the first gear ratio. The second portion is greater than the first portion.

In a further example, a non-transitory computer readable medium is provided having stored thereon instructions that, when executed by a computing device, cause the computing device to perform operations. The operations include receiving a command to change a direction of rotation of an output shaft of a transmission from a first direction to a second direction opposite to the first direction. The transmission comprises an input shaft, the output shaft, and a first plurality of gears having a first gear ratio. The first plurality of gears is configured to transfer motion of the input shaft to the output shaft. The transmission has an extent of backlash deadband. The operations also include, in response to the received command, driving the transmission through a first portion of the extent of backlash deadband by driving the input shaft with a first motor to drive the output shaft in the second direction through the first gear ratio. The first motor is connected to the input shaft. The operations further include driving the transmission through a second portion of the extent of backlash deadband by driving the output shaft in the second direction through a second gear ratio with a second motor to bias the transmission to the first motor. The second motor is connected to the output shaft of the transmission through a second plurality of gears having the second gear ratio. The second gear ratio is smaller than the first gear ratio. The second portion is greater than the first portion.

In a yet further example, a system is provided that includes a transmission having an input means, an output means, and a first plurality of gears. The first plurality of gears is configured to transfer motion of the input means to the output means. Additionally, the transmission has an extent of backlash deadband. The system also includes a first actuating means connected to the input means of the transmission and a second actuating means connected to the output means of the transmission. The second actuating means is connected to the output means through a second plurality of gears. A first gear ratio of the first plurality of gears is greater than a second gear ratio of the second plurality of gears. The system additionally includes a control means configured to receive a command to change a direction of rotation of the output means from a first direction to a second direction opposite to the first direction. The control means may, in response to the received command, provide instructions to drive the transmission through a first portion of the extent of backlash deadband by driving the input means with the first actuating means to drive the output means in the second direction through the first gear ratio.

The control means may also provide instructions to drive the transmission through a second portion of the extent of backlash deadband by driving the output means in the second direction through the second gear ratio with the second actuating means to bias the transmission to the first actuating means. The second portion is greater than the first portion.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
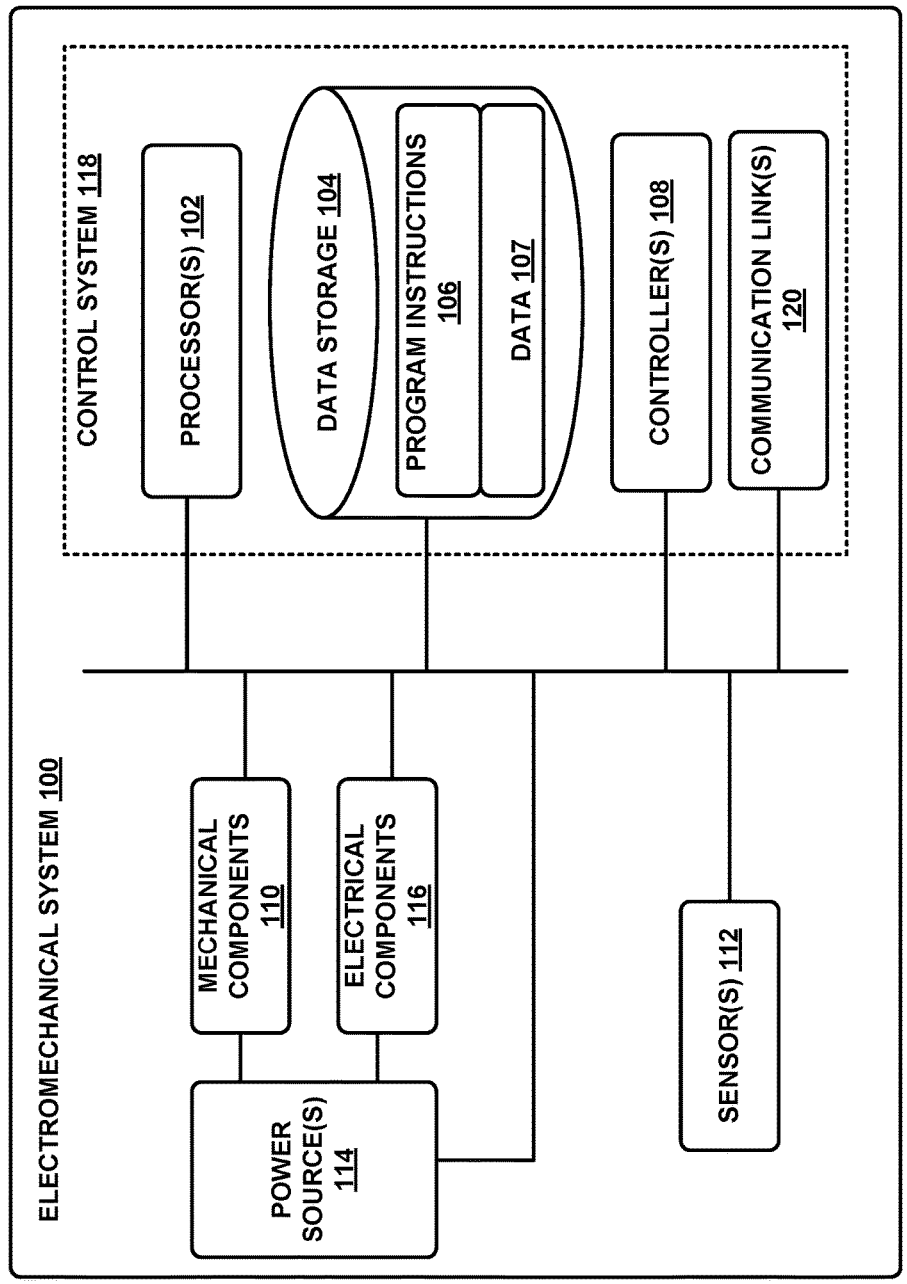
FIG. 1 illustrates a block diagram of an electromechanical system, according to an example embodiment.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that aspects of the present disclosure, as generally described herein and illustrated in the figures, can be arranged, substituted, combined, separated, and designed in a wide variety of different configurations, all of which are contemplated herein.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

I. OVERVIEW

Example electromechanical systems such as robots, vehicles, power tools, appliances, and any components thereof may be actuated by motors through one or more gears. The gears may form or be part of a transmission, gearbox, or gear train. The gears may be used to amplify or attenuate a motor torque or motor speed at an input of the transmission into a desired output torque or output speed at an output of the transmission. For example, a high gear ratio (e.g., a gear ratio greater than one) may be used to amplify a small motor torque at the transmission input into a large output torque at the transmission output. At the same time, the high gear ratio may attenuate the speed of rotation of the motor at the transmission input into a low output speed at the transmission output.

In some electromechanical systems, the transmissions and other components of the electromechanical systems may include high tolerance (low precision) parts. The high tolerance parts may result in the transmission or component of the electromechanical system having a large extent of backlash deadband. Backlash deadband is the clearance or lost motion in a mechanism caused by gaps between parts of the mechanism. Backlash may be present in a mechanism due to manufacturing errors, deflection under load, thermal expansion, and thermal contraction, among other possibilities. Backlash may also be an intentional design choice to ensure that clearance between parts allows for lubrication, avoids parts seizing, and/or reduces manufacturing time and/or costs.

In one example, a robotic device may need to be manufactured within a given budget in order to be affordable to a target end-user. In order to manufacture the robotic device within the given budget, components of the robotic device may be manufactured to high tolerances. The high tolerances may introduce into parts of the robotic device a high extent of backlash deadband. The large extent of backlash deadband may need to be managed, reduced, or eliminated in order to allow the robotic device to function as intended (e.g., perform precise movements).

In another example, components of a prototype electromechanical system may be printed in three dimensions (3D printing) to allow for rapid evaluation of the performance of the prototype. 3D printing a plastic part may be faster and less expensive than manufacturing the part from metal. However, the 3D printing process may produce a part with higher tolerances. The high-tolerance parts may introduce into the mechanism a larger extent/amount of backlash deadband than would low tolerance metal parts. The large extent of backlash deadband may need to be managed, reduced, or eliminated in order to test operations of the prototype system.

The extent of backlash deadband of a mechanical system or transmission may be managed, reduced, or eliminated by connecting an antagonistic motor to the output of the transmission. The input of the transmission may be driven by a drive motor. The primary function of the drive motor may be to drive/actuate a load on the output shaft of the transmission. The primary function of the antagonistic motor may be to drive the transmission through the extent of backlash to bias the transmission to the drive motor. Operations of the drive motor and the antagonist motor may be synchronized or coordinated to reduce a length of time to drive the transmission through the extent of backlash and bias the transmission to the first motor.

In general, the extent of the backlash deadband of the transmission may need to be traversed in order to bias the transmission to the first motor any time the direction of rotation of the output shaft changes. For example, when a commanded direction of rotation of the output shaft changes from clockwise to counterclockwise, the transmission may need to be driven through the extent of backlash in the counterclockwise direction. Once driven through the backlash, a rotation of the first motor may produce a corresponding counterclockwise rotation at the output shaft.

The drive motor may drive the input shaft of the transmission to drive the output shaft of the transmission through a first plurality of gears of the transmission having a first gear ratio. The antagonist motor may drive the output shaft of the transmission through a second plurality of gears having a second gear ratio. Additionally, the second gear ratio may be smaller than the first gear ratio. Thus, the antagonist motor may be configured to drive the output shaft with a higher speed and a lower torque than the first motor. As a result, the antagonist motor may drive the transmission through the extent of backlash deadband faster than the drive motor.

In some embodiments, the antagonist motor may be connected to the output shaft of the transmission through a belt drive (e.g., a toothed belt drive, a flat belt drive). The second plurality of gears may be connected together by a belt to reduce or eliminate the extent of backlash between the antagonist motor and the output shaft of the transmission. In other embodiments, the drive motor may also be connected to the input shaft of the transmission by a drive belt.

The backlash management apparatus and backlash management operations described herein may be faster, less expensive, and require fewer components to implement than an apparatus having two fully parallel motors and transmissions (e.g., two identical transmissions and two identical motors). The apparatus with two fully parallel transmissions may require two of each component of the apparatus. Consequently, a weight, cost, and size of the fully parallel apparatus is increased, thus increasing a cost, weight, and size of the electromechanical system utilizing the fully-parallel apparatus. Furthermore, since a gear ratio of the fully parallel transmissions is the same and the size of the two motors driving the two fully-parallel transmissions is the same, each of the two fully-parallel transmissions drives through the extent of backlash deadband at the same speed. Accordingly, a time required to drive through the backlash in the fully parallel apparatus is halved in comparison to driving through the backlash with only one of the two fully parallel transmissions.

In contrast, the backlash management apparatus described herein utilizes two asymmetric transmissions to reduce cost and part count and increase a speed with which the apparatus drives through the extent of backlash. Additionally, the antagonist motor may be smaller than the drive motor. Accordingly, since the second gear ratio is smaller than the first gear ratio, the antagonist motor produces a faster response and a lower torque at the output shaft than the first motor. Although lower, the torque of the antagonist motor at the output shaft may be sufficient to drive the transmission through the extent of backlash deadband even when the output of the transmission is connected to a load.

A gear ratio between the drive motor and the antagonist motor (e.g., a ratio of the first gear ratio to the second gear ratio) may be greater than one. For example, the gear ratio between the drive motor and the antagonist motor may be 10:1. Consequently, assuming the two motors to be identical, the drive motor may be configured apply to the output shaft a maximum torque ten times greater than a maximum torque that the antagonist motor can apply to the output shaft. Thus, a primary function of the drive motor may be to drive the load on the output shaft of the transmission. A secondary function of the drive motor may be to drive the transmission through a portion of the extent of backlash deadband to bias the transmission to the first motor.

On the other hand, (still assuming identical motors) due to the 10:1 gear ratio between the drive motor and the antagonist motor, the antagonist motor may be configured to rotate the output shaft with a maximum speed that is ten times greater than a maximum speed with which the drive motor can rotate the output shaft. Thus, a primary function of the antagonist motor may be to quickly drive the transmission through a portion of the extent of backlash deadband to bias the transmission to the first motor. A secondary function of the antagonist motor may be to drive the load on the output shaft of the transmission.

Due to the first gear ratio, the drive motor may drive the transmission through a first portion of the extent of backlash when the output shaft is commanded to change a direction of rotation. Due to the second gear ratio, the antagonist motor may drive the transmission through a second portion of the extent of backlash deadband when the output shaft is commanded to change the direction of rotation. The second portion may be greater than the first portion due to the antagonist motor being configured to drive the output shaft with a higher speed and a lower torque than the drive motor. Accordingly, the antagonist motor may work to reduce a time needed to traverse the backlash deadband of the system. In some embodiments, the first portion and the second portion may be approximately equal to the total extent of the backlash deadband of the transmission.

In one example, when the gear ratio between the drive motor and the antagonist motor is 10:1, the second portion may be ten times greater than the first portion since the second motor is configured to drive the output shaft of the transmission with a speed ten times faster than the first motor. Accordingly, the length of time needed to drive the transmission through the extent of backlash using both the drive motor and the antagonist motor may be one eleventh the length of time needed to drive the transmission through the extent of backlash using only the drive motor. In contrast, if the second plurality of gears was a second transmission fully parallel to the first transmission, the length of time would only be halved.

In order to produce the first gear ratio, the first plurality of gears may include a first number of gears. Likewise, in order to produce the second gear ratio, the second plurality of gears may include a second number of gears. Since the first ratio is greater than the second gear ratio, the first number may be greater than the second number. Thus, the part count of the asymmetric gear arrangement described herein may be smaller than a part count of two fully parallel transmissions.

Furthermore, since backlash may increase with the number of gears, a first extent of backlash of the first plurality of gears may be greater than a second extent of backlash of the second plurality of gears. In some examples, the second extent of backlash of the second plurality of gears may be negligible in comparison to the first extent of backlash of the first plurality of gears. In one example, the second extent of backlash may be smaller than 10% of the first extent of backlash. In contrast, the transmission backlash of each of the two fully parallel transmissions may be equal. Thus, the fully parallel arrangement may need to manage the transmission backlash of two transmissions as opposed to only one.

A control system may be used to control the backlash management apparatus described herein to reduce or eliminate the effect of backlash deadband on the performance of an electromechanical system or components thereof. When a torque magnitude of the first motor or a torque magnitude of the output shaft exceeds a first threshold, the antagonist motor may be caused to drive the output shaft in a direction opposite to that of the drive motor. In other words, the antagonist motor may work against the drive motor. Since the first gear ratio may be greater than the second gear ratio (and the drive motor may be larger/more powerful than the antagonist motor), the first motor may overpower the second motor, resulting in the output shaft rotating in the direction dictated by the first motor.

Driving the antagonist motor in the direction opposite to the drive motor may preload the antagonist motor to drive through the extent of backlash deadband when the output shaft is commanded to change a direction of rotation. Specifically, since the antagonist motor is already opposing the current direction of rotation of the output shaft, when the direction of rotation of the output shaft is commanded to change, the antagonist will already be applying a torque in the new, changed direction. Thus, the response of the antagonist motor will be immediate or at least have less delay than if the antagonist motor also had to switch directions. The antagonist will drive the output shaft in the new, changed direction, thus driving the load in the desired/commanded direction and driving the transmission through the backlash to bias the transmission to the first motor.

In response to the command to change a direction of rotation of the output shaft, the drive motor may reverse a direction of rotation in order to drive the transmission through the backlash and then drive the output shaft in the new, changed direction. However, since the drive motor may be connected to the output shaft through the first gear ratio larger than the second gear ratio, the drive motor might only drive through a small portion of the backlash deadband. The antagonist motor may drive through most of the backlash deadband.

When the transmission is biased to the first motor, the first motor may drive the load in the new, changed direction. The antagonist may continue to drive the output shaft in the new, changed direction until the torque magnitude of the drive motor or the torque magnitude of the output shaft again exceeds the first threshold after changing directions. When the first threshold is again exceeded, the antagonist may drive the output shaft in a direction opposite to the new, changed direction. Thus, the antagonist may again be preloaded to drive through the backlash when another change of direction of the output shaft is commanded.

In some embodiments, when a torque magnitude of the output shaft or the drive motor exceeds a second torque threshold higher than the first threshold, the antagonist motor may be commanded to drive the output shaft in the same direction as the drive motor. Thus, under heavy load conditions, the drive motor and the antagonist motor may work together to drive the output shaft. When the torque magnitude of the output shaft or drive motor drops below the second threshold, the antagonist may again be commanded to oppose the drive motor in order to preload the antagonist motor to drive through backlash in response to a change in the direction of rotation of the output shaft of the transmission.

In some embodiments, the drive motor, the antagonist motor, and the output shaft may be equipped with position encoders/sensors. The position encoders may be used to determine an extent of backlash deadband within the transmission or electromechanical system. The position encoders may also be used to determine a position of the transmission within the extent of backlash deadband of the transmission. Thus, the control system may determine, based on the data from the position encoders, a number of rotations by which the drive motor and the antagonist motor may need to turn in order to drive through the backlash and bias the transmission to the first motor.

The control system may additionally determine a torque profile for the drive motor and/or the antagonist motor to follow in order to reduce a force of impact between the gears of the transmission when the transmission is fully biased the drive motor. The torque curve may indicate to drive through the backlash quickly when the transmission is near the middle of the extent of backlash deadband. The torque curve may also indicate to cause the antagonist motor and the drive motor to reduce a speed of rotation as the transmission approaches either limit of the extent of backlash deadband, thus reducing a force of impact between the gears of the transmission. Reducing the force of impact by following the torque curve may extend a usable lifetime of the transmission and any components of the electromechanical system utilizing the transmission. Additionally, reducing the force of impact by following the torque curve may reduce an audible noise of the transmission during operation.

Additionally, reducing the force of impact by following the torque curve may improve the performance of the electromechanical system utilizing the transmission. Specifically, when the load on the transmission is a robotic member controlled via position feedback control (e.g., a position-based PID feedback loop), a large impact between the gears may result in the robotic member repeatedly overshooting a target position of the robotic member, resulting in oscillations about the target positions. Reducing the force of impact may reduce or eliminate the oscillations, thus allowing the robotic member to more quickly reach the target positions.

II. EXAMPLE ROBOTIC SYSTEMS

FIG. 1 illustrates an example configuration of an electromechanical system 100 that may be used in connection with the embodiments described herein. The electromechanical system 100 may be configured to operate autonomously, semi-autonomously, and/or using directions provided by user(s). The electromechanical system 100 may be implemented in various forms, such as a robotic device (e.g., walking robot, a stationary robotic manipulator with an end effector), a ground vehicle, an aerial vehicle, a medical device, or a consumer device. Furthermore, the electromechanical system 100 may also be referred to as a robot, robotic device, or mobile robot, among other designations.

As shown in FIG. 1, the electromechanical system 100 may include processor(s) 102, data storage 104, and controller(s) 108, which together may be part of a control system 118. The electromechanical system 100 may also include sensor(s) 112, power source(s) 114, mechanical components 110, electrical components 116, and communication link(s) 120. Nonetheless, the electromechanical system 100 is shown for illustrative purposes, and may include more or fewer components. The various components of electromechanical system 100 may be connected in any manner, including wired or wireless connections. Further, in some examples, components of the electromechanical system 100 may be distributed among multiple physical entities rather than a single physical entity. Other example illustrations of electromechanical system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the electromechanical system 100, such as sensor(s) 112, power source(s) 114, mechanical components 110, electrical components 116, and/or communication link(s) 120.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some embodiments, the data storage 104 can be a single physical device. In other embodiments, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks) interface between any combination of the mechanical components 110, the sensor(s) 112, the power source(s) 114, the electrical components 116, the control system 118, the communication link(s) 120, and/or a user of the electromechanical system 100. In some embodiments, the controller 108 may be a purpose-built embedded device for performing specific operations with one or more subsystems of the electromechanical system 100.

The control system 118 may monitor and physically change the operating conditions of the electromechanical system 100. In doing so, the control system 118 may serve as a link between portions of the electromechanical system 100, such as between mechanical components 110 and/or electrical components 116. In some instances, the control system 118 may serve as an interface between the electromechanical system 100 and another computing device. Further, the control system 118 may serve as an interface between the electromechanical system 100 and a user. For instance, the control system 118 may include various components for communicating with the electromechanical system 100, including a joystick, buttons, and/or ports, etc. The example interfaces and communications noted above may be implemented via a wired or wireless connection, or both. The control system 118 may perform other operations for the electromechanical system 100 as well.

In some implementations, the control system 118 of electromechanical system 100 may also include communication link(s) 120 configured to send and/or receive information. The communication link(s) 120 may transmit data indicating the state of the various components of the electromechanical system 100. For example, information read by sensor(s) 112 may be transmitted via the communication link(s) 120 to a separate device. Other diagnostic information indicating the integrity or health of the power source(s) 114, mechanical components 110, electrical components 116, processor(s) 102, data storage 104, and/or controller 108 may be transmitted via the communication link(s) 120 to an external communication device.

In some implementations, the electromechanical system 100 may receive information at the communication link(s) 120 that is then processed by the processor(s) 102. The received information may indicate data that is accessible by the processor(s) 102 during execution of the program instructions 106. Further, the received information may change aspects of the controller(s) 108 that may affect the behavior of the mechanical components 114 or the electrical components 116. In some cases, the received information may indicate a query requesting a particular piece of information (e.g. the operational state of one or more of the components of the electromechanical system 100). The processor(s) 102 may subsequently transmit the particular piece of information back out the communication link(s) 120.

In some cases, the communication link(s) 120 may include a wired connection. The electromechanical system 100 may include one or more ports to interface the communication link(s) 120 to an external device. The communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, the control system 118 may communicate with other systems of the electromechanical system 100 via wired or wireless connections, and may further be configured to communicate with one or more users of the robot. As one possible illustration, the control system 118 may receive an input (e.g., from a user or from another robot) indicating an instruction to actuate the electromechanical system 100 to perform a series of tasks such as moving objects between different locations. The input to control system 118 may be received via the communication link(s) 120.

Based on this input, the control system 118 may perform operations to cause the electromechanical device 100 to use sensors 112 to scan an environment of the electromechanical system 100 (e.g., robotic system) and use mechanical components 110 to pick up and move an object identified by the scan.

Operations of the control system 118 may be carried out by the processor(s) 102. Alternatively, these operations may be carried out by the controller 108, or a combination of the processor(s) 102 and the controller 108. In some embodiments, the control system 118 may partially or wholly reside on a device other than the electromechanical system 100, and therefore may at least in part control the electromechanical system 100 remotely. Communication link(s) 120 may be used at least in part to carry out the remote communication.

Mechanical components 110 represent hardware of the electromechanical system 100 that may enable the electromechanical system 100 to perform physical operations. As a few examples, the mechanical components 110 may include physical members such as leg(s), arm(s), wheel(s), linkage(s), and/or end effector(s). The mechanical components 110 or other parts of electromechanical system 100 may further include motors, actuators, and/or transmissions/gearboxes/gear-trains arranged to move the physical members in relation to one another. The electromechanical system 100 may also include one or more structured bodies for housing the control system 118 and/or other components, and may further include other types of mechanical components. The particular mechanical components 110 used in a given electromechanical system may vary based on the design of the electromechanical, and may also be based on the operations and/or tasks the electromechanical may be configured to perform.

In some examples, the mechanical components 110 may include one or more removable components. The electromechanical system 100 may be configured to add and/or remove such removable components, which may involve assistance from a user and/or another robot. For example, the electromechanical system 100 may be configured with removable arms, hands, feet, legs, wheels, linkages, and/or end effectors so that these members can be replaced or changed as needed or desired. In some embodiments, the electromechanical system 100 may include one or more removable and/or replaceable battery units or sensors. Other types of removable components may be included within some embodiments.

The electromechanical system 100 may include sensor(s) 112 arranged to sense aspects of the electromechanical system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the electromechanical system 100 may be configured to receive sensor data from sensors that are physically separated from the electromechanical system (e.g., sensors that are positioned on other electromechanical systems/devices or located within the environment in which the electromechanical system is operating).

The sensor(s) 112 may provide sensor data to the processor(s) 102 (perhaps by way of data 107) to allow for interaction of the electromechanical system 100 with its environment, as well as monitoring of the operation of the electromechanical system 100. The sensor data may be used in evaluation of various factors for activation, movement, and deactivation of mechanical components 110 and electrical components 116 by control system 118. For example, the sensor(s) 112 may capture data corresponding to the terrain of the environment, location of nearby objects, and/or identity of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the electromechanical system 100 is operating. The sensor(s) 112 may monitor the environment in real time, and detect obstacles, elements of the terrain, weather conditions, temperature, and/or other aspects of the environment.

Further, the electromechanical system 100 may include sensor(s) 112 configured to receive information indicative of the state of the electromechanical system 100, including sensor(s) 112 that may monitor the state of the various components of the electromechanical system 100. The sensor(s) 112 may measure activity of systems of the electromechanical system 100 and receive information based on the operation of the various features of the electromechanical system 100, such the operation of extendable legs, arms, wheels, linkages, actuators, motors, and/or other mechanical and/or electrical features of the electromechanical system 100. The data provided by the sensor(s) 112 may enable the control system 118 to determine errors in operation as well as monitor overall operation of components of the electromechanical system 100.

As an example, the electromechanical system 100 may use force sensors to measure load on various components of the electromechanical system 100. In some implementations, the electromechanical system 100 may include one or more force sensors on one or more mechanical members such as a arms, legs, wheels, linkages, manipulators, and/or end effectors to measure the load on the actuators or motors that move the one or more members. As another example, the electromechanical system 100 may use one or more position sensors to sense the position of the actuators of the electromechanical system 100. For instance, such position sensors may sense states of extension, retraction, and/or rotation of the actuators/motors on arms or legs of the electromechanical system 100.

As another example, the sensor(s) 112 may include one or more velocity and/or acceleration sensors. The sensor(s) 112 may measure both linear and angular velocity and/or acceleration. For instance, the sensor(s) 112 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of the electromechanical system 100 based on the location of the IMU in the electromechanical system 100 and the kinematics of the electromechanical system 100.

The electromechanical system 100 may include other types of sensors not explicated discussed herein. Additionally or alternatively, the electromechanical system may use particular sensors for purposes not enumerated herein.

The electromechanical system 100 may also include one or more power source(s) 114 configured to supply power to various components of the electromechanical system 100. Among other possible power systems, the electromechanical system 100 may include a hydraulic system, pneumatic system, electrical system, batteries, and/or other types of power systems. As an example illustration, the electromechanical system 100 may include one or more batteries configured to provide charge to components of the electromechanical system 100. Some of the mechanical components 110 and/or electrical components 116 may each connect to a different power source, may be powered by the same power source, or be powered by multiple power sources.

Any type of power source may be used to power the electromechanical system 100, such as electrical power or a gasoline engine. Additionally or alternatively, the electromechanical system 100 may include a hydraulic system configured to provide power to the mechanical components 110 using fluid power. Components of the electromechanical system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the electromechanical system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the electromechanical system 100. The electrical components 116 may interwork with the mechanical components 110 to enable the electromechanical system 100 to perform various operations. The electrical components 116 may be configured to provide power from the power source(s) 114 to the various mechanical components 110, for example. Further, the electromechanical system 100 may include electric motors. Other examples of electrical components 116 may exist as well.

Although not shown in FIG. 1, the electromechanical system 100 may include a body, which may connect to or house appendages and components of the electromechanical system. As such, the structure of the body may vary within examples and may further depend on particular operations that a given electromechanical system may have been designed to perform. For example, an electromechanical system developed to carry heavy loads may have a wide body that enables placement of the load. Similarly, an electromechanical system designed to reach high speeds may have a narrow, small body that does not have substantial weight. Further, the body and/or the other components may be developed using various types of materials, such as metals or plastics. Within other examples, an electromechanical system may have a body with a different structure or made of various types of materials.

The body and/or the other components may include or carry the sensor(s) 112. These sensors may be positioned in various locations on the electromechanical device 100, such as on the body and/or on one or more of the appendages, among other examples.

On its body, the electromechanical system 100 may carry a load, such as a type of cargo that is to be transported. The load may also represent external batteries or other types of power sources (e.g., solar panels) that the electromechanical system 100 may utilize. Carrying the load represents one example use for which the electromechanical system 100 may be configured, but the electromechanical system 100 may be configured to perform other operations as well.

As noted above, the electromechanical system 100 may include various types of legs, arms, wheels, tracks, treads, linkages, motors, actuators, and so on. In general, the electromechanical system 100 may be configured with zero or more legs. An implementation of the electromechanical system with zero legs may include wheels, tracks, treads, or wings, thrusters, rotors, or some other form of locomotion. An implementation of the electromechanical system with two legs may be referred to as a biped or bipedal robot, and an implementation with four legs may be referred as a quadruped or quadrupedal robot. Implementations with six or eight legs are also possible.

Figure 2:
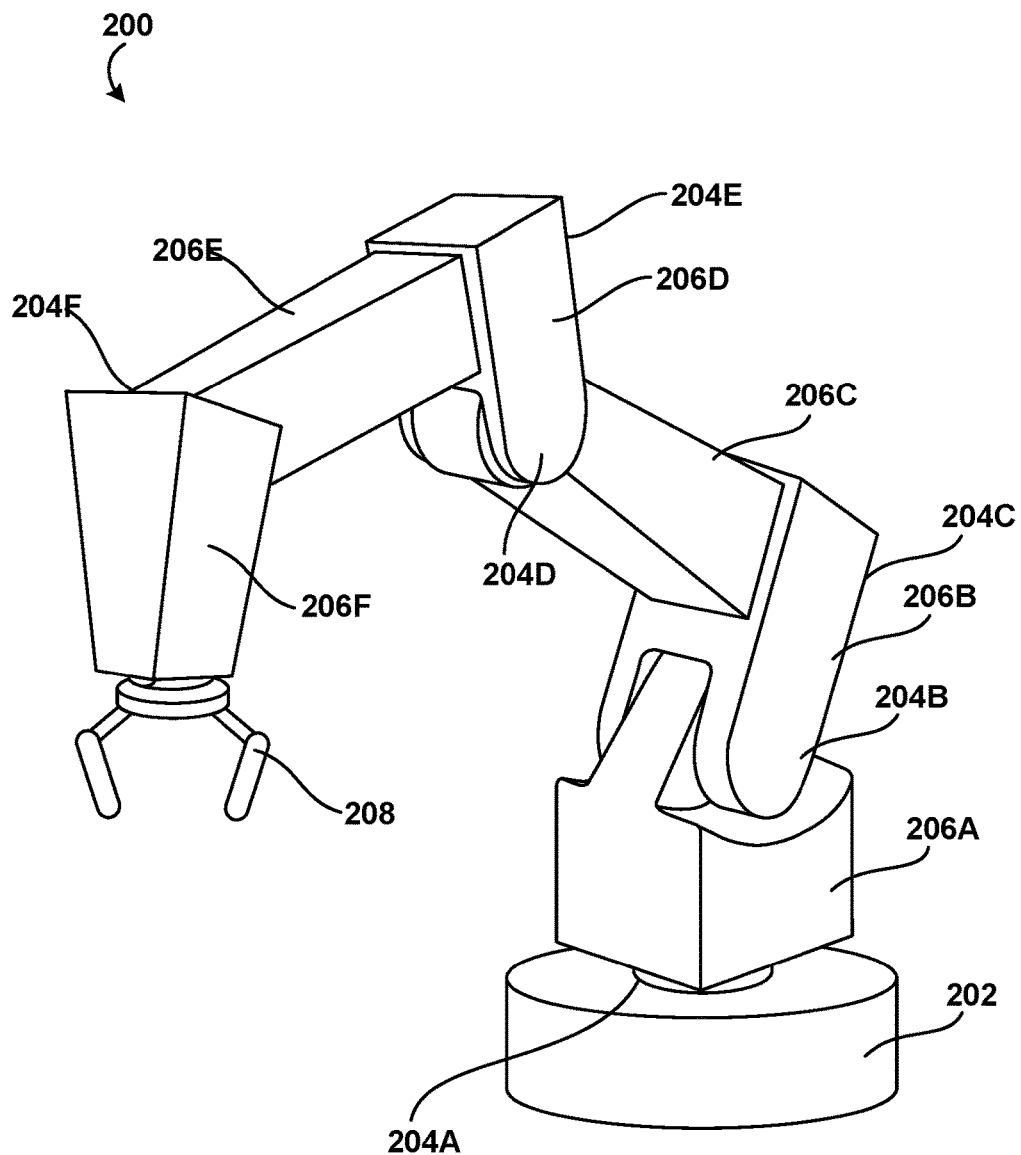
FIG. 2 illustrates an example robotic arm, according to an example embodiment.

FIG. 2 shows an example robotic arm 200. Robotic arm 200 may be one example of electromechanical system 100. As shown, the robotic arm 200 includes a base 202, which may be a stationary base or may be a movable base. In the case of a movable base, the base 202 may be considered as one of the mechanical components 110 and may include wheels (not shown), powered by one or more motors/actuators, which allow for mobility of the entire robotic arm 200.

Additionally, the robotic arm 200 includes joints 204A-204F each coupled to one or more actuators. The motors/actuators in joints 204A-204F may operate to cause movement of various mechanical components 110 such as appendages 206A-206F and/or end effector 208. For example, the actuator in joint 204F may cause movement of appendage 206F and end effector 208 (i.e., since end effector 208 is coupled to appendage 206F). The motors/actuators in joints 204A-204F may drive the corresponding appendages 206A-206F and/or end effector 208 through one or more transmissions, gearboxes, or gear trains. The one or more transmissions may be simple transmissions, compound transmissions, planetary gear transmission, differential transmissions, or a combination thereof.

Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible. The devices and operations disclosed herein may increase the precision with which a low-cost robotic arm and end effector manufactured with wide tolerances can be positioned and moved to perform various operations.

III. EXAMPLES OF BACKLASH IN A TRANSMISSION

The arms, legs, hands, feet, wheels, linkages, end effectors, and any other appendages or members of example electromechanical system 100 and/or robotic arm 200 may be driven by respective motors through one or more gearboxes/transmissions/gear trains. The transmissions may have therein an extent of backlash deadband that may need to be traversed before a motion of an input of the transmission is transferred to an output of the transmission. The backlash deadband may limit a precision with which the linkages of robot 200 may be controlled by a control system of robot 200.

Within examples, backlash may be defined as the clearance or lost motion in a mechanism caused by gaps between the parts of the mechanism. The gaps between the parts may be due to manufacturing errors, deflection under load, thermal expansion and contraction, as well as intentional design choice to ensure adequate lubrication or minimize manufacturing costs, among other possibilities. The extent of backlash deadband for a given part of a mechanical system may be defined as the maximum distance or angle through which the given part of the mechanical system may be moved in one direction without applying appreciable force or motion to a next part in a mechanical sequence of parts of the mechanical system. The extent of backlash of a gearbox, transmission, or gear train may be defined as the maximum distance or angle through which an input of the gearbox, transmission, or gear train may be moved in one direction without applying appreciable force or motion to an output of the gearbox, transmission, or gear train. The backlash deadband may alternatively be referred to as lash, play, backlash, and deadband.

Figure 3A:
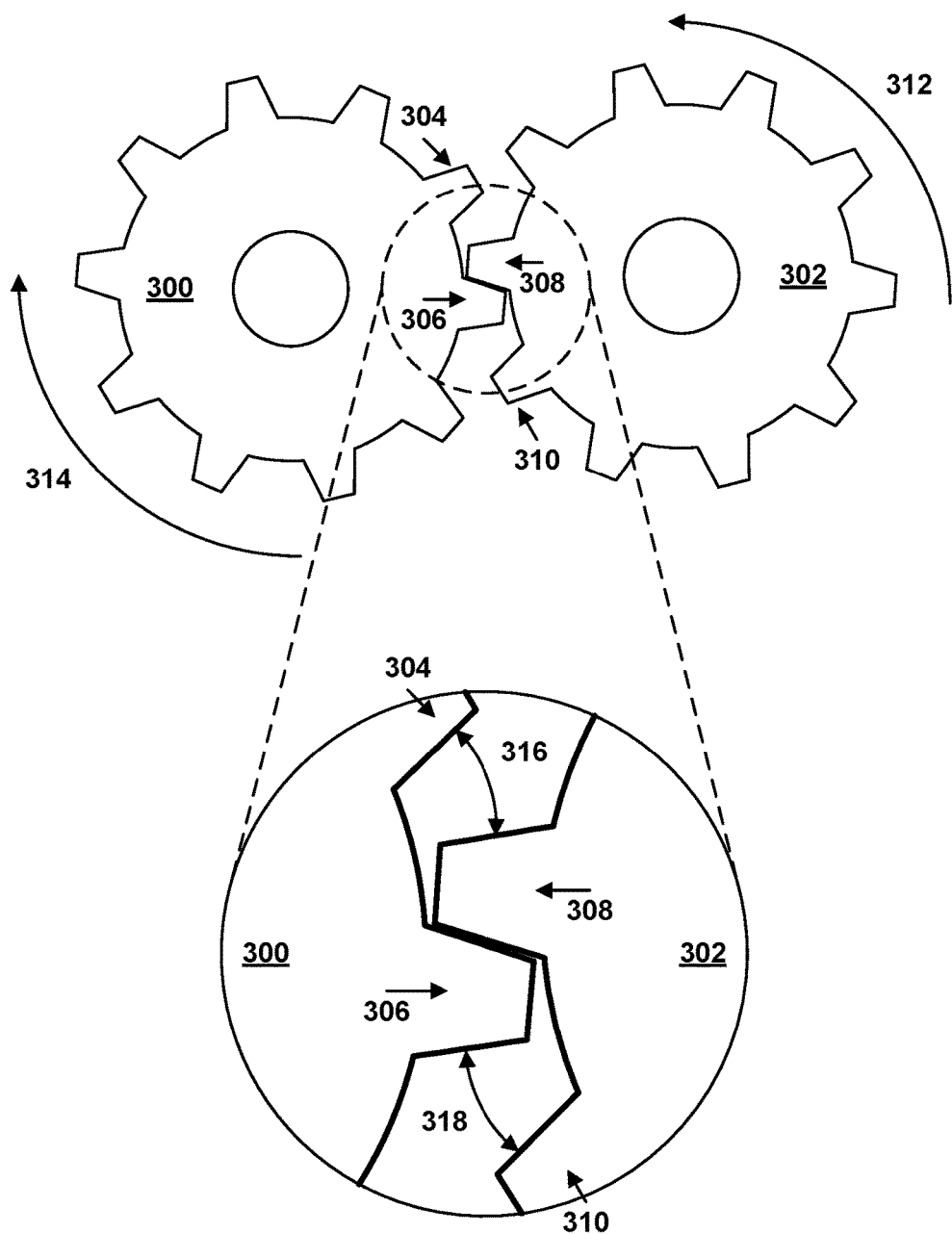
FIGS. 3A, 3B, and 3C illustrate backlash between two gears, according to an example embodiment.
Figure 3B:
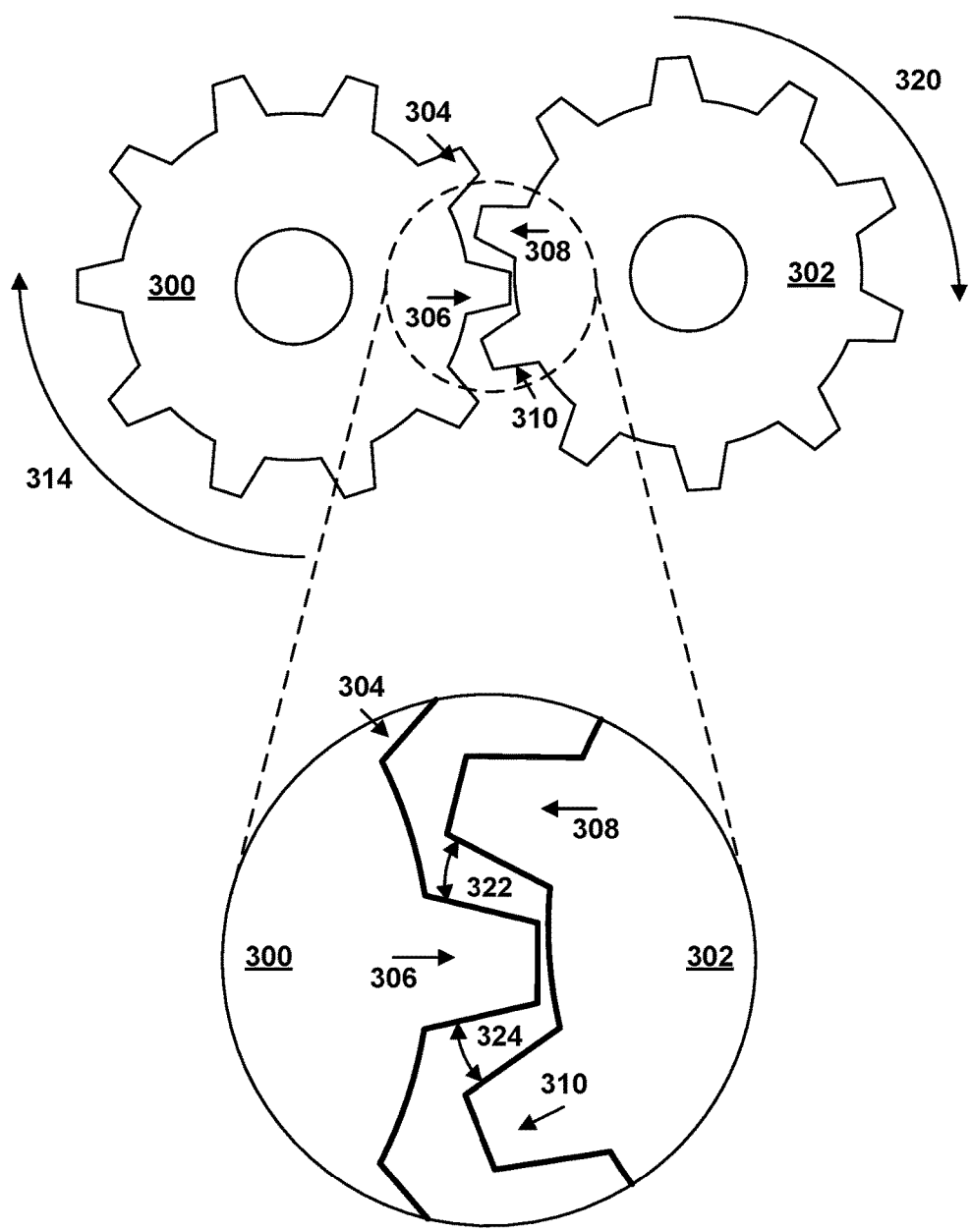
Figure 3C:
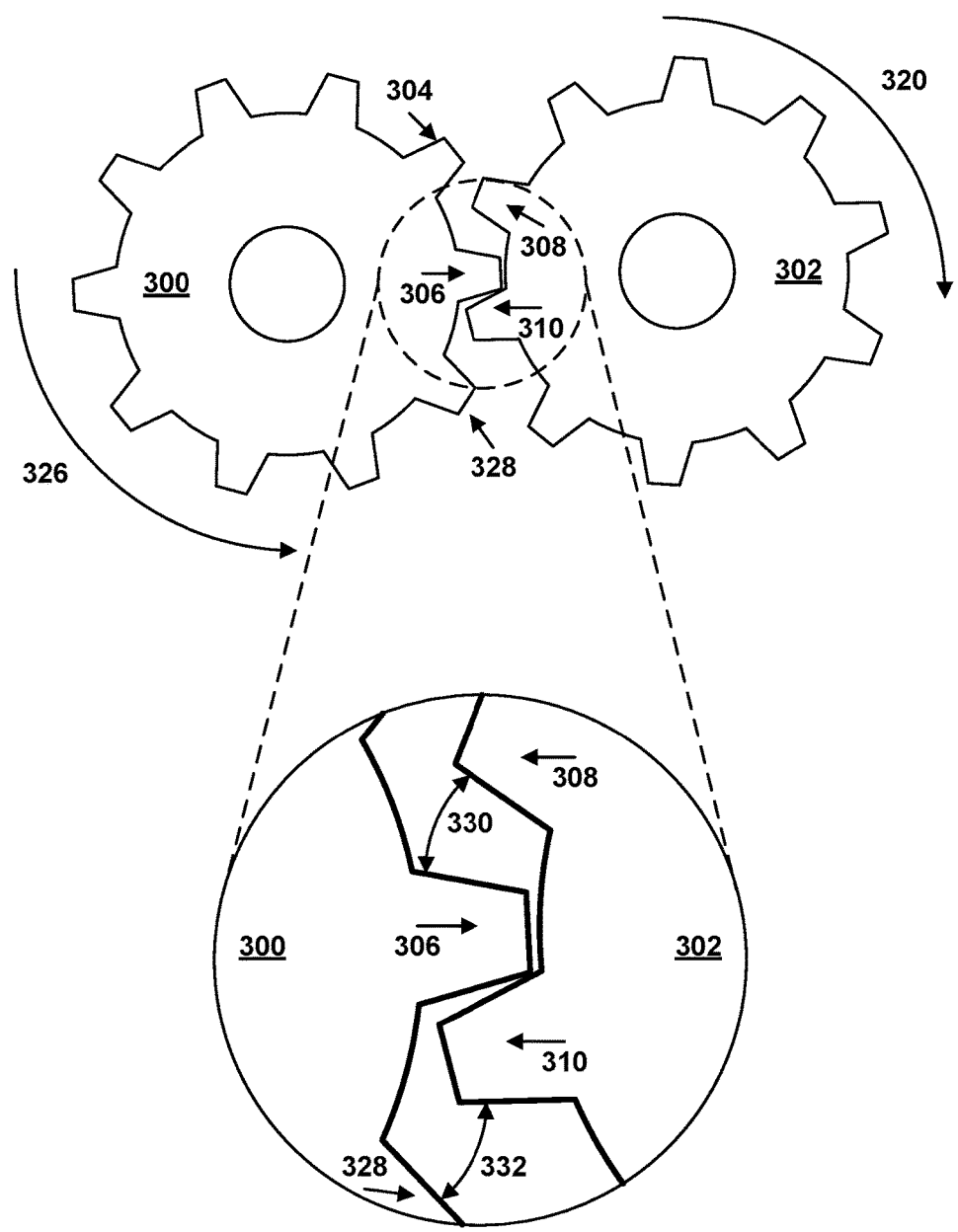

FIGS. 3A, 3B, and 3C illustrate the concept of backlash between two spur gears 300 and 302. Gears 300 and 302 may be part of a transmission or gearbox. Gear 302 is initially rotating in a first, counterclockwise direction, as indicated by arrow 312. Gear 302 is driving gear 300 in a second, clockwise direction, as indicated by arrow 314. Accordingly, gear 302 may be referred to as driving gear and gear 300 may be referred to as a driven gear. Force is applied to gear 300 by gear 302 via at least gear tooth 308 of gear 302 meshing with and pushing against gear tooth 306 of gear 300.

The extent of backlash deadband between gear 300 and 302 may be the gap 316 between gear tooth 304 of gear 300 and gear tooth 308 of gear 302. Equivalently, the extent of backlash deadband between gear 300 and 302 may be the gap 318 between gear tooth 306 of gear 300 and gear tooth 310 of gear 302. The gaps 316 and 318 may be equal or approximately equal. Approximately equal may encompass the nominal size or basic size value (e.g., a value or dimension specified by the manufacturer) of the gap 316 being equal to a nominal size or basic size value of the gap 318. Additionally, approximately equal may encompass variations in the actual measured dimension of the gaps 316 and 318 that are within a tolerance range of the gaps 316 and 318. In other words, approximately equal is defined herein to encompass size variations due to manufacturing process variations and errors that are within a tolerance range specified for a given part or set of parts.

When gear 302 switches the direction of rotation from the first, counterclockwise direction 312 to the second, counterclockwise direction 320, as illustrated in FIG. 3B, gear 302 may need to traverse the extent of backlash deadband 316 and 318 between gears 300 and 302 before applying a driving force to gear 300. Specifically, gear tooth 308 may need to move through the gap 316 before engaging gear tooth 304. Similarly, gear tooth 310 may need to move through gap 318 before engaging gear tooth 306. Gear 300 may continue rotating in the second, clockwise direction 314 due to inertia of the gear 300 and/or inertia of other components of the system (not shown) while gear 302 traverses the extent of backlash deadband 316 and 318. FIG. 3B illustrates an intermediate state in which gear tooth 306 of gear 302 has traversed a portion 322 of the backlash deadband 316. Gear tooth 310 still has to traverse a portion 324 of the extent of backlash deadband 318 before engaging with gear tooth 306.

FIG. 3C illustrates a final state after gear 302 has completely driven through the extent of backlash deadband 316 and 318. Specifically, gear tooth 310 of gear 302 is shown engaging gear tooth 306 of gear 300, thereby transferring a rotational motion of gear 302 to gear 300. In the state illustrated in FIG. 3C, the transmission/gear train comprising gears 300 and 302 can be described as being biased to gear 302 and/or a motor/actuator currently driving gear 302. Within examples, when a transmission is biased to a motor in a first direction, a rotation of the motor in the first direction will result in immediate transfer of the motion of the motor to an output shaft of the transmission. In other words, when a transmission is biased to the motor in a particular direction (e.g., clockwise rotation direction), the motor does not have to move through the extent of backlash deadband of the transmission to produce a motion/force at the output shaft of the transmission corresponding to rotation in the particular direction.

After traversing the extent of backlash deadband 316 and 318, as illustrated in FIG. 3C, the rotation of gear 302 in the clockwise direction 320 causes a corresponding counterclockwise rotation 326 in the gear 300. Both gears 300 and 302 are now rotating in respective directions 326 and 320 that are opposite to the respective initial directions 314 and 312. With the gears 300 and 302 rotating in respective directions 326 and 320, the extent of backlash deadband now includes the gaps 330 and 332. The gaps 330 and 332 may be equal or at least approximately equal to the gaps 316 and 318. When the gear 302 is commanded or caused to again change a direction of rotation (e.g., change from direction 320 to direction 312), gear tooth 308 may need to move through the backlash deadband 330 to engage gear tooth 306. Similarly, gear tooth 310 may need to move through backlash deadband gap 332 to engage gear tooth 328.

When additional gears are added to gears 300 and 302, each additional gear may increase the extent of backlash deadband of the transmission or gear train. Thus, an extent of backlash of the transmission or gear train as a whole may be the sum of the extents of backlash deadband between individual gears making up the transmission or gear train. For example, assuming gears 300 and 302 to be identical gears, the addition of a third, identical gear to the gear train of FIG. 3C would result in a total extent of backlash deadband of the three-gear transmission being equal to or approximately equal to twice the gap 316, 318, 330, and/or 332.

Gear train backlash may be undesirable for a number of reasons. First, traversing the extent of backlash of a mechanical system creates a delay between when a motor drives an input shaft of the transmission and when a corresponding force or motion is applied or observed at the output of the transmission. The delay between motion at the transmission input and the transmission output may make the transmission unfit for applications that require a fast response time such as motor-assisted vehicle power steering systems.

Second, backlash may be undesirable because it may decrease a degree of precision with which parts of an electromechanical system may be controlled. For example, when a control system of a robot commands a given joint of a robot to move to a target position, the extent of backlash deadband in a transmission corresponding to the given joint may cause the joint to oscillate about the target position before eventually settling to the target position (e.g., oscillations in a PID feedback system). As a result of the oscillation, a time delay between when the control system issues the command to move the joint to the target position and when the joint is successfully moved to the target position may cause the robot to perform poorly. Poor robot performance may be characterized by erratic motion of the robotic limbs, an unstable gait or posture of the robot resulting in the robot falling over, and/or a low dexterity when picking up, holding, moving, and placing down objects of interest.

Third, repeatedly traversing through the extent of backlash deadband of a transmission may result in damage to the gears of the transmission. For example, as gear tooth 310 of gear 302 moves through the extent of backlash deadband 318, the inertia of gear 302 increases. Upon making contact with gear tooth 306, gear 310 exerts a large impulse on gear tooth 306 due to the inertia of gear 302. The larger the backlash deadband gap 318, the larger the inertia of gear 302 at the moment of engagement with gear 300 and, consequently, the larger the impulse exerted on the engaging gear teeth. Repeated high-impulse engagements between gear teeth of a gear train may cause damage to the gears of the transmission or gear train. Accordingly, controlling a manner in which the extent of backlash deadband of a transmission is traversed may be just as important as reducing and/or minimizing an amount of time it takes to traverse the extent of backlash deadband during directional changes.

One way of minimizing backlash may be to use transmissions and other robotic parts that have been manufactured to lower tolerances (e.g., manufactured precisely). However, low-tolerance, high-precision parts may be too expensive to use in low-cost robotic devices. Robotic devices may be limited to low-precision parts in order to make the robotic devices affordable to a target market.

In another example, a technology in which parts of a robotic device are manufactured may be limited in the precision of parts that can be manufactured. For example, transmissions and other robotic components may be printed in three dimensions (3D-printed) to allow for rapid testing and evaluation of various designs of the robotic device and components thereof. Although a final version of the robotic device may eventually be manufactured with high-precision parts, prototype designs leading up to the final design may need to be manufactured quickly, via a low-precision process (e.g., 3D printing). Thus, backlash deadband in the prototype designs may need to be reduced, eliminated, and/or managed in order to test the prototype design and any control systems thereof.

IV. EXAMPLE ANTAGONISTIC ACTUATOR IMPLEMENTATIONS

Described herein are arrangements of motors and gears directed at managing, reducing, or eliminating an extent of backlash deadband of a transmission and any mechanical components connected thereto. Further, control systems and example control operations are provided herein for controlling the arrangement of motors and gears to reduce or eliminate the extent of backlash deadband in a electromechanical system.

Figure 4A:
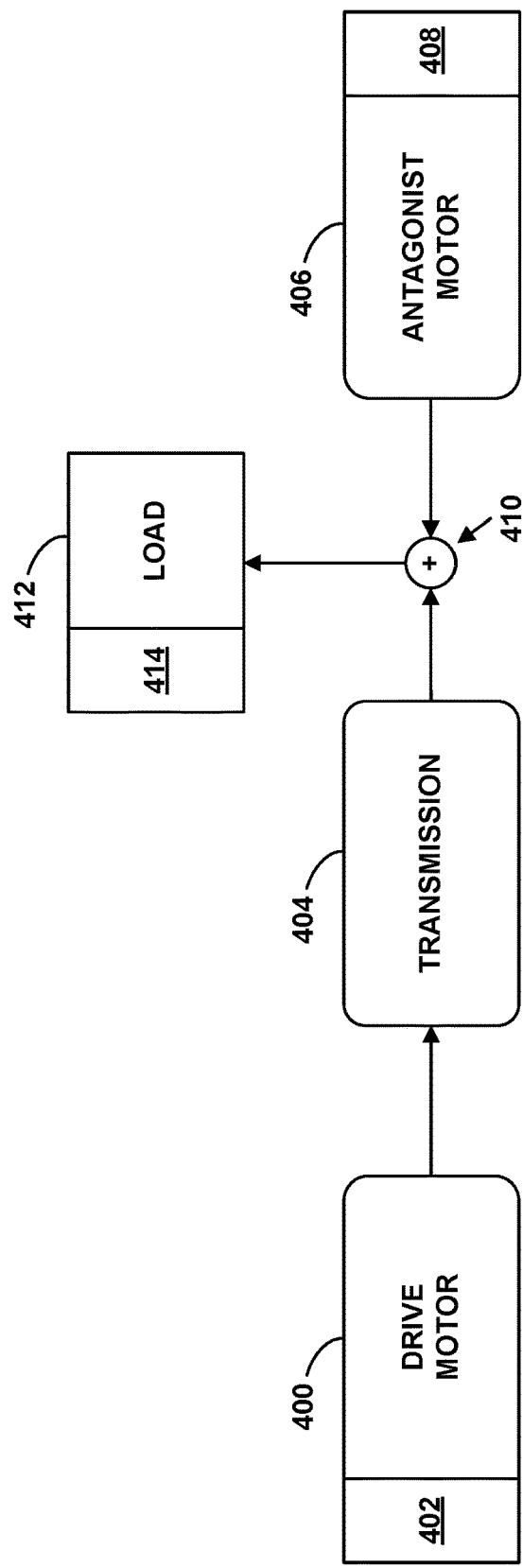
FIG. 4A illustrates a block diagram of an example system for managing backlash in a transmission, according to an example embodiment.

FIG. 4A illustrates a block diagram of an example arrangement of electromechanical components that may be used to manage, reduce, or eliminate the extent of backlash deadband of a transmission. Specifically, a drive motor 400 (a first motor) may be connected to an input of transmission 404. Load 412 may be connected to an output of transmission 404. An antagonistic motor 406 (a second motor) may also be connected to the output of transmission 404. The drive motor 400, the antagonistic motor 408, and the load 414 may have connected thereto a plurality of sensors 402, 408, and 414, respectively. The torque at the output of transmission 406 due to the drive motor 400 and the antagonist motor 406 may be linearly additive, as indicated by summing junction 410.

Within examples, drive motor 400 (the first motor) and antagonist motor 406 may be any actuator or mechanism that converts a given type of energy into mechanical energy and/or mechanical motion that can be used to drive the input and output of transmission 404. The given type of energy may be electric, hydraulic, pneumatic, and/or chemical, among others. In some examples, motors 400 and/or 406 may be capable of bidirectional drive (e.g., forward and reverse, clockwise and counterclockwise rotation, etc.) of the input and output, respectively, of transmission 404. For example, motors 400 and 406 may be electric motors, hydraulic motors, compressed air engines, or combustion engines, among other possibilities. An electromechanical embodiment of drive motor 400 may be a direct current (DC) motor or an alternating current (AC) motor. For example, motor 400 may be a servo motor, a stepper motor, or a linear motor.

The drive motor 406 may be configured to drive the load 412 through transmission 404. Drive motor 404 may be the primary means of actuating load 412. Accordingly, drive motor 404 may be larger than antagonist motor 406 and may drive the load 412 through a larger gear ratio than antagonist motor 406. In order to drive or actuate load 412, transmission 404 may need to be driven through at least a portion of the extent of backlash deadband in order to bias transmission 404 to the first motor.

Transmission 404 may include a first plurality of gears configured to transfer a motion of the transmission input to the transmission output. In some embodiments, transmission 404 may be a planetary gear transmission. The planetary gear transmission may be characterized by the axes of rotation of at least a portion of the first plurality of gears being configured to move relative to a fixed axis of rotation (e.g., a reference axis such as an axis of rotation of the output shaft of the transmission). In other embodiments, transmission 404 may be a simple or compound spur gear transmission. The simple and compound spur gear transmissions may be characterized by axes of rotation of each of the gears of the first plurality of gears being fixed relative to a reference axis (e.g., the axis of rotation of the output shaft).

The first plurality of gears may have a first gear ratio. In some examples, the first gear ratio may be a ratio greater than one. Consequently, the transmission may increase or amplify the torque at the input of transmission 404 into a larger torque at the output of transmission 404. The transmission may also decrease or attenuate a speed of rotation or motion at the input of transmission 404 into a smaller speed of rotation or motion at the output of transmission 404. In other embodiments, the first gear ratio may be smaller than one. Accordingly, the transmission may increase or amplify the speed of rotation or motion at the input of transmission 404 and may decrease or attenuate the torque at the input of transmission 404.

The first gear ratio may be a variable gear ratio (e.g., controlled manually or automatically). The variable gear ratio may allow a control system to adapt the torque and speed multiplication of transmission 404 based on a mechanical resistance of load 412, a power or torque of drive motor 400, and/or a power or torque of antagonist motor 406. Transmission 404 may have a greater extent of backlash deadband when the first gear ratio is a large gear ratio (e.g., a gear ratio greater than and/or much greater than a gear ratio of one). The extent of backlash may take a longer time to traverse when the first gear ratio is high (e.g., greater than one) than when the first gear ratio is low (e.g., less than one). The longer time may be due to an increased inertia of the first plurality of gears when the first gear ratio is high and a decreased speed of rotation of the first plurality of gears when the first gear ratio is high.

The input of transmission 404 may be an input shaft, an input gear, or an input shaft with a gear thereon. Likewise, the output of transmission 404 may be an output shaft, an output gear, or an output shaft with a gear thereon. Gears mounted on the input and output shafts may mesh with one or more other gears of the drive motor 400, the antagonist motor 406, and/or the load 412.

The antagonist motor 406 may be configured to bias the transmission 404 to the first motor by driving the output shaft of transmission 404 in a particular direction. Biasing the transmission 404 to the drive motor 400 may be a primary function of antagonist 406. Accordingly, antagonist motor 406 may be smaller (e.g., smaller as characterized by power, torque, speed, etc.) than drive motor 400 and may drive the output of transmission 404 through a smaller gear ratio than antagonist motor 406 (e.g., the second gear ratio smaller than the first gear ratio). Driving the load 412 may be a secondary function of antagonist motor 406.

The antagonist motor 406 may be connected to the output of transmission 404 through a second plurality of gears (not shown). For example, a gear on the output shaft of antagonist motor 406 may mesh directly with a gear on the output shaft of transmission 404 to reduce and/or minimize an inertia of the second plurality of gears. Alternatively, the second plurality of gears may comprise a second transmission, gearbox, or gear train (not shown) similar to transmission 404. The second plurality of gears may have a second gear ratio smaller than the first gear ratio of the first plurality of gears. Due to the second gear ratio being smaller than the first gear ratio, the antagonist motor 406 may require less time to drive through the extent of backlash deadband than drive motor 400. Accordingly, coupling motor 406 to the output of transmission 404 and synchronizing the operations of drive motor 400 and antagonist motor 406 may reduce a time associated with driving transmission 404 through the extent of backlash deadband.

Biasing transmission 404 to the first motor may comprise driving transmission 404 through at least a portion of the extent of backlash deadband. The particular direction may depend on a current commanded direction of rotation of the output shaft of transmission 404 and a previous direction of rotation of the output of transmission 404. For example, when the output shaft of transmission 404 switches a direction of rotation from counterclockwise rotation (e.g., a first direction) to clockwise rotation (e.g., a second direction), the antagonist motor 406 may apply a clockwise torque to the output shaft of transmission 404 to drive transmission 404 through at least a portion of the extent of backlash deadband, thus biasing the transmission 404 to the first motor.

When the transmission 404 is biased to the first motor in the commanded or planned direction of rotation, motion at the input of the transmission 404 will result in corresponding motion at the output of transmission 404. For example, when transmission 404 is biased to drive motor 400 in a clockwise direction, clockwise rotation of motor 400 may produce a corresponding rotation at the output of transmission 404. However, counterclockwise rotation of motor 400 might not produce a corresponding rotation at the output of transmission 404 until the drive motor 400 drives the transmission through the extent of backlash deadband in the counterclockwise direction. Similarly, when transmission 404 is biased to drive motor 400 in counterclockwise direction, counterclockwise rotation of motor 400 may produce a corresponding rotation at the output of transmission 404. However, clockwise rotation of motor 400 might not produce a corresponding rotation at the output of transmission 404 until the drive motor 400 drives the transmission through the extent of backlash deadband in the clockwise direction.

Sensors 402, 408, and 414 may include position sensors, torque sensors, velocity sensors, acceleration sensors, current sensors, and voltage sensors, among other types of possible sensors. For example, sensors 402, 408, and 414 may include motor position encoders that may be used to determine the extent of backlash deadband of transmission 404 and determine a position of transmission 404 within the extent of backlash deadband. In another example, motors 400 and 406 may be electric motors and sensors 402 and 408 may include current sensors to measure motor currents of motors 400 and 406. The motor currents may be used to determine a motor torque corresponding to motors 400 and 406. The determined motor torques may be multiplied by the corresponding gear ratio and may be summed to determine a torque applied to load 412.

Figure 4B:
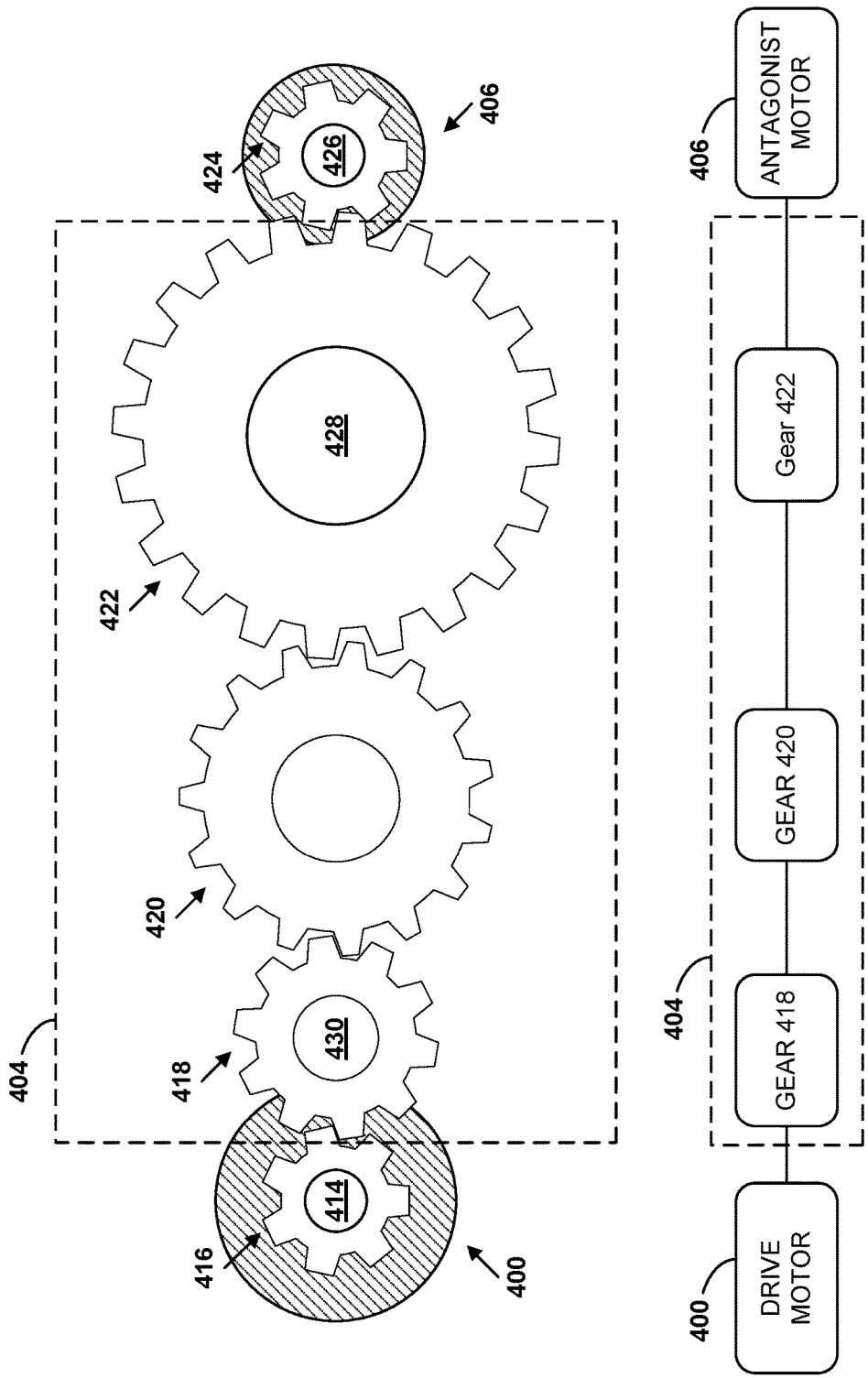
FIG. 4B illustrates an example arrangement of gears of an example system for managing backlash, according to an example embodiment.

FIG. 4B shown an alternative illustration of the system of FIG. 4A. Specifically, FIG. 4B illustrates example gears that may make up the first plurality of gears and the second plurality of gears. The bottom portion of FIG. 4B is a block diagram representing the components of the top portion of FIG. 4B.

In example transmission 404, gear 418 may be mounted on or connected to input shaft 430 of transmission 404. Gear 422 may be mounted on or connected to output shaft 428 of transmission 404. Gear 420 may transfer a motion of the input gear 418 to output gear 422. The first plurality of gears of the transmission 404 may include gears 418, 420, and 422. The first plurality of gears may also include gear 416 since gear 416 may determine a gear ratio between motor 400 and output shaft 428 of transmission 404.

The drive motor 400 may include shaft 414 with gear 416 mounted thereon or connected thereto. Gear 414 may mesh with gear 418 on the input shaft 430 of transmission 404. Drive motor 400 may drive the output shaft 428 of transmission 404 by driving the input shaft 430. Specifically, gear 418 on the input shaft 430 of transmission 404 may be driven by gear 416 on the shaft 414 of drive motor 400. The first gear ratio of the first plurality of gears may be a gear ratio between gear 416 and gear 428 (e.g., a gear ratio of the gear train comprising gears 416, 418, 420, and 422 or a gear ratio between motor 400 and transmission output 428). The first gear ratio may be different than the gear ratio shown in or implied by FIG. 4B. The first gear ratio may be greater than one to amplify a torque of drive motor 400 to drive a load on the output shaft 420 of transmission 404. In some embodiments, motor shaft 414 and input shaft 430 may be connected directly through a non-geared shaft coupling or adapter.

Antagonist motor 406 may include shaft 426 with gear 424 mounted thereon or connected thereto. Gear 424 may mesh with gear 422 on the output shaft 428 of transmission 404. Antagonist motor 400 may drive the output shaft 428 of transmission 404 by driving the output shaft 420 directly. Specifically, gear 428 on the output shaft 428 of transmission 404 may be driven by gear 424 on the shaft 426 of antagonist motor 406. When gear 422 is driven by gear 424 of the antagonist motor, motion of gear 424 may also be transferred to gears 420, 418, and 416. Thus, driving gear 422 with gear 424 may allow the antagonist motor to drive transmission 404 to bias the transmission to the drive motor.

The second plurality of gears may include gears 422 and 424. The second gear ratio of the second plurality of gears may be a gear ratio between gear 424 and gear 422 (e.g., a gear ratio between the antagonist motor 424 and the output shaft 428 of transmission 404). The second gear ratio may be different than the gear ratio shown in or implied by FIG. 4B.

The first plurality of gears (gears 416, 418, 420, and 422) may include a first number of gears (e.g., 4 gears) in order to achieve the first gear ratio. The second plurality of gears (gears 422 and 424) may include a second number of gears (e.g., 2 gears) in order to achieve the second gear ratio. The first number of gears may be greater than the second number of gears in order to produce a first gear ratio higher than the second gear ratio.

The extent of backlash deadband of transmission 404 may be the sum of (i) the backlash deadband between gear 416 and gear 418, (ii) the backlash deadband between gear 418 and gear 420, and (iii) the backlash deadband between gear 420 and 422. The second plurality of gears (e.g., gears 422 and 424) may also include an extent of backlash deadband between gear 422 and 424. However, due to the second gear ratio being smaller than the first gear ratio and/or the second number of gears being smaller than the first number of gears, the extent of backlash deadband of the second plurality of gears may be less than 10% of the backlash deadband of the first plurality of gears. Accordingly, in some embodiments, the extent of backlash deadband of the second plurality of gears may be negligible in comparison to the extent of backlash deadband of the first plurality of gears.

V. EXAMPLE ANTAGONISTIC ACTUATOR CONTROL OPERATIONS

Figure 5:
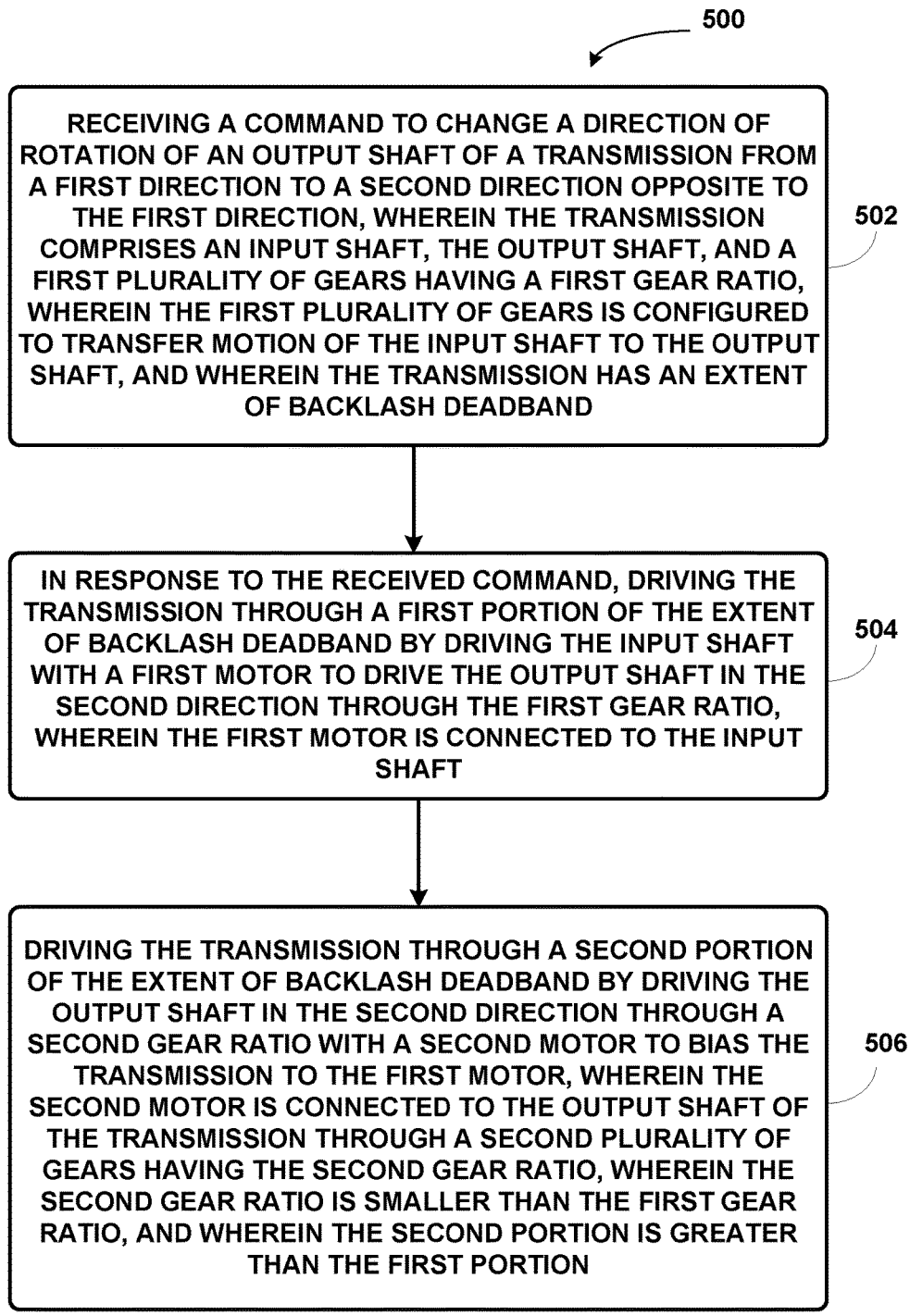
FIG. 5 illustrates example operations for managing backlash, according to an example embodiment.

FIG. 5 illustrates example operations 500 that may be performed by the example system illustrated in FIG. 4A or 4B to manage, reduce, or eliminate the effect of the extent of backlash deadband of the system on the performance of the system. Specifically, in block 502, a command may be received to change a direction of rotation of an output shaft of a transmission from a first direction to a second direction opposite to the first direction. The transmission may be transmission 404 of FIG. 4A. The transmission may include an input shaft, the output shaft, and a first plurality of gears having a first gear ratio. The first plurality of gears may be configured to transfer motion of the input shaft to the output shaft. The transmission may have an extent of backlash deadband. The extent of backlash deadband may need to be traversed before a motion of the input shaft is transferred to the output shaft through the first plurality of gears. The first direction may be a forward direction and the second direction may be a reverse direction. Alternatively, the first direction may be a clockwise direction and the second direction may be a counterclockwise direction.

In block 504, in response to the received command of block 502, the transmission may be driven through a first portion of the extent of backlash deadband by driving the input shaft with a first motor to drive the output shaft in the second direction through the first gear ratio. The first motor may be the drive motor 400 illustrated in FIG. 4A. The output shaft of the transmission may be driven in the second direction either by driving the input shaft in the first direction or in the second direction. Depending on a number of gears in the transmission and the type of transmission (e.g., simple spur gear transmission, planetary gear transmission), clockwise rotation at the input of the transmission may result in either clockwise or counterclockwise rotation at the output of the transmission.

In block 506, the transmission may be driven through a second portion of the extent of backlash deadband by driving the output shaft in the second direction through a second gear ratio with a second motor to bias the transmission to the first motor. The second motor may be connected to the output shaft of the transmission through a second plurality of gears having the second gear ratio smaller than the first gear ratio. Driving the output shaft by the second motor through the second gear ratio may drive the transmission through a second portion of the extent of backlash deadband. The second portion may be greater than the first portion.

The second motor may be antagonist motor 406 of FIG. 4A. The second plurality of gears may include, for example a first gear on the output shaft of the transmission meshing with a second gear on the output shaft of the second motor. A number of gears in the first plurality of gears of the transmission may be greater than a number of gear in the second plurality of gears. The greater number of gears of the first plurality of gears may result in the first gear ratio being greater than the second gear ratio. The sum of the first portion of the extent of backlash deadband and the second portion of the extent of backlash deadband may be approximately equal to the extent of backlash deadband of the transmission (e.g., a total of the extent of backlash deadband of the transmission). Approximately equal may encompass variations and deviations from exactly equal caused by vibrations of the electromechanical system and inertia of the motors, transmission, the load, and any other mechanical components of the electromechanical system, as discussed with respect to FIGS. 3A, 3B, and 3C. The approximately equal condition may be satisfied when the transmission is biased to the first motor, the extent of backlash of the transmission is effectively traversed, and/or motion of the input shaft is immediately transferred to the output shaft (e.g., without lost motion of the input shaft).

Due to the second gear ratio of the second plurality of gears being smaller than the first gear ratio of the first plurality of gears of the transmission, the second motor may drive the transmission through a greater portion of the extent of backlash deadband than the first motor. The first gear ratio may amplify the torque of the first motor applied to the input shaft of the transmission into a correspondingly larger torque at the output shaft of the transmission. At the same time, the first gear ratio may attenuate the input rotational velocity of the first motor applied to the input shaft of the transmission into a correspondingly smaller rotational velocity at the output shaft of the transmission. In contrast, the second gear ratio may amplify the torque of the second motor by a smaller amount than the first gear ratio. Similarly, the second gear ratio may attenuate the rotational velocity of the second motor by a smaller amount than the first gear ratio.

Accordingly, the second motor may be able to apply less torque to the output of the transmission. However, the second motor may be able to drive the output shaft of the transmission with a higher rotational velocity. Consequently, in a given period of time, the second motor may drive the transmission through a greater portion of the extent of backlash deadband than the first motor. Thus, the second motor may reduce an amount of time required to bias the transmission to the first motor and improve a response time of changing the direction of rotation of the output of the transmission. Accordingly, the second motor and the control system thereof, as described herein, may mitigate the effects of backlash deadband of a transmission on the performance of a system utilizing the transmission.

The first motor and the second motor may be identical, nearly identical, or at least comparable. For example, the motors may produce the same or comparable peak power, the same or comparable stall torque, the same or comparable maximum unloaded rotational velocity, etc. Comparable is herein intended to mean within 10% of manufacturer specifications. When the first motor and the second motor are not identical or comparable, the first gear ratio and the second gear ratio may be configured to produce the performance characteristics described herein. For example, the first motor may be smaller than the second motor. However, the first gear ratio may be large enough to allow the first motor to apply a greater torque to the output of the transmission than the second motor through the second gear ratio. In other words, a maximum stall torque exerted on the output shaft of the transmission by the first motor through the first plurality of gears may be greater than a maximum stall torque exerted on the output shaft of the transmission through the second plurality of gears.

Figure 6:
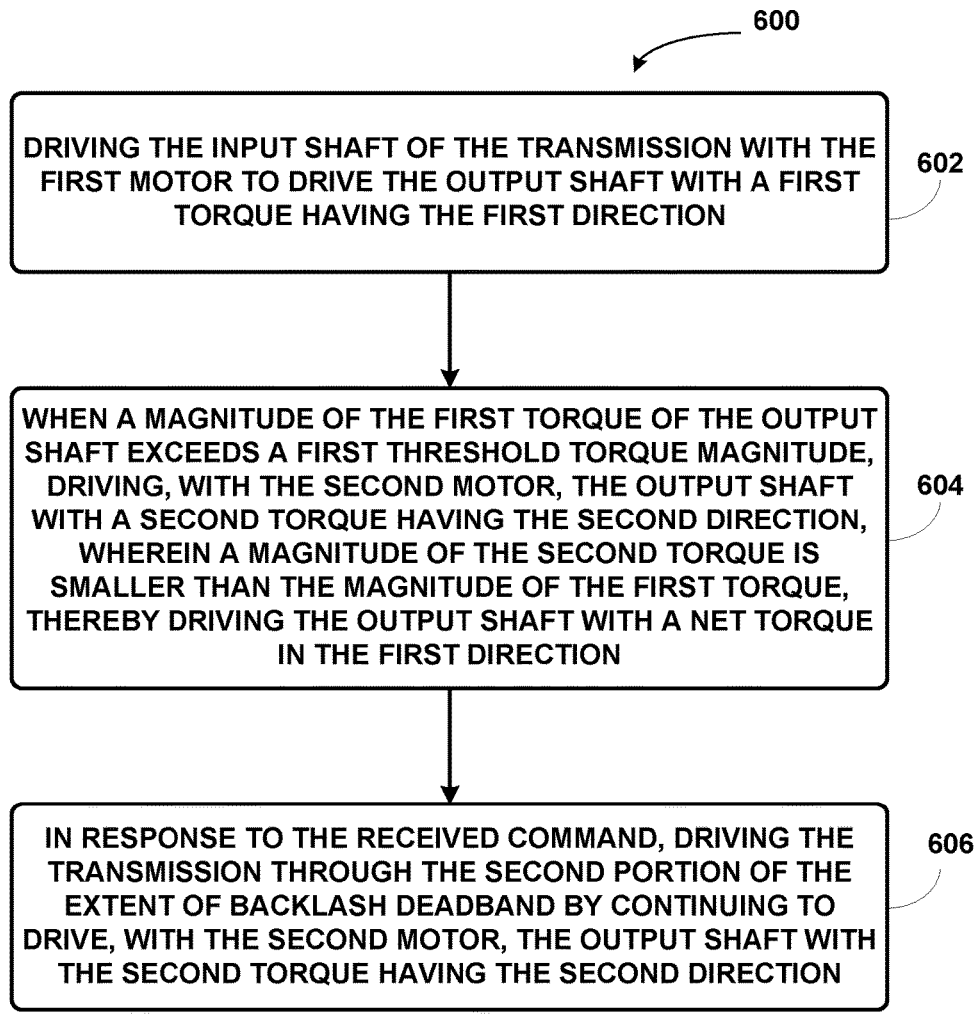
FIG. 6 illustrates additional example operations for managing backlash, according to an example embodiment.

FIG. 6 illustrates flow diagram 600 of additional example operations that may be performed by the example electromechanical systems illustrated and (e.g., the system illustrated in FIG. 4A) described herein to manage backlash. In block 602, the input shaft of the transmission may be driven with the first motor to drive the output shaft with a first torque having the first direction. The first torque may be a first desired, planned, and/or commanded output torque. A control system configured to provide instructions to drive the output shaft with the first commanded output torque having the first direction may determine, based on the first gear ratio of the first plurality of gears, a corresponding first torque and/or first current with which to drive the first motor (e.g., the drive motor 400) in order to produce the first commanded output torque at the output shaft. The operation of block 602 may be performed prior to receiving the command to change a direction of rotation of the output shaft from the first direction to the second direction.

In block 604, when a magnitude of the first torque of the output shaft exceeds a first threshold torque magnitude, the second motor may drive the output shaft with a second torque having the second direction. A magnitude of the second torque may be smaller than the magnitude of the first torque, thereby driving the output shaft with a net torque in the first direction (e.g., causing the output shaft to rotate in the first direction). The magnitude of the first torque of the output shaft may be measured directly at the output shaft of the transmission or may be determined based on the first torque and/or first current of the first motor and the corresponding first gear ratio. The control system configured to provide instructions to apply the second torque having the second direction to the output shaft of the transmission may determine, based on the second gear ratio of the second plurality of gears, a corresponding second torque and/or second current with which to drive the second motor (e.g., the antagonist motor 406) in order to apply the second torque to the output shaft of the transmission.

In block 606, in response to the received command, the transmission may be driven through the second portion of the extent of backlash deadband by continuing to drive, with the second motor, the output shaft with the second torque having the second direction. Causing the second motor to apply the second torque having the second direction while the first motor drives the output shaft with the first, larger torque having the first direction causes a preloading of the second motor. Specifically, since the second motor is applying the second torque having the second direction before the system provides and/or receives a command to change the direction of rotation of the output shaft from the first direction to the second direction, the second motor does not have to undergo a rotational direction change in order to drive the transmission output in the second direction when the command to change the direction of rotation is provided and/or received. Accordingly, there is minimal to no delay in the response of the second motor to the command to change the direction of rotation. Thus, in addition to driving the output shaft through the second, smaller gear ratio, the second motor further decreases the amount of time to bias the transmission to the first motor via the preloading illustrated in FIG. 6.

Figure 7:
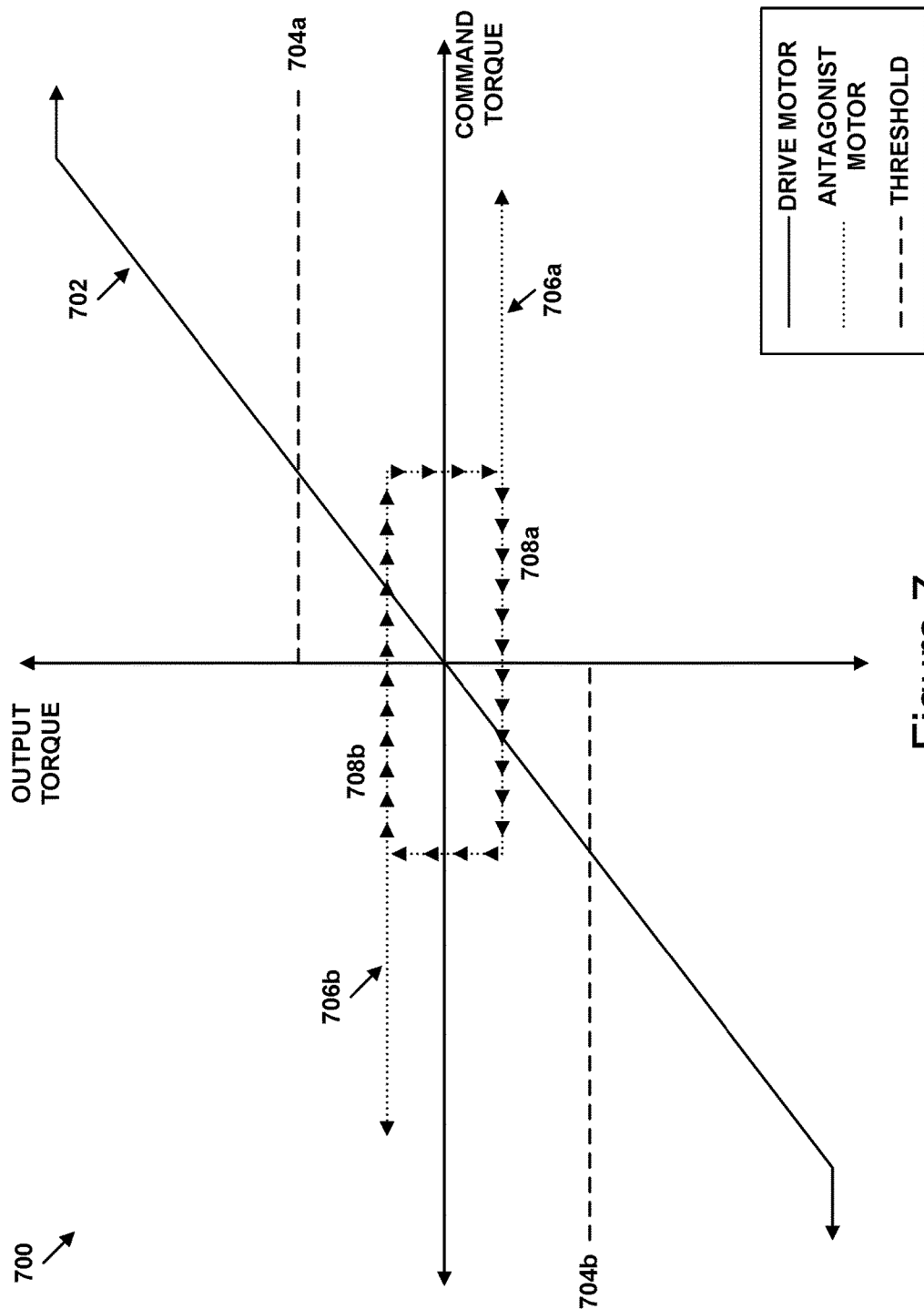
FIG. 7 illustrates an example torque curve, according to an example embodiment.

The operations of flow diagram 500 and 600 are further illustrated graphically by graph 700 of FIG. 7. The horizontal axis (e.g., the x-axis) of graph 700 represents a command torque provided to the first motor or to the transmission output. The vertical axis (e.g., the y-axis) represents an output torque of the first motor and the second motor. Torques to the right of the vertical axis may have a first direction of rotation (e.g., clockwise rotation). Torques to the left of the vertical axis may have a second direction of rotation (e.g., counterclockwise rotation). Similarly, torques above the horizontal axis may have the first direction of rotation and torques below the vertical axis may have the second direction of rotation.

Solid line 702 represents the relationship between a command torque provided to the output shaft or to the first motor (e.g., motor 400 of FIG. 4A) and an output torque produced by the first motor. Specifically, line 702 indicates a linear relationship between the commanded torque and the produced torque of the first motor. In some examples, when the commanded torque is a torque commanded to the first motor, the linear relationship may be a one-to-one relationship (e.g., the line may have a slope of one unit of produced torque per unit of commanded torque). In alternative embodiments, the slope may be greater than one or smaller than one to account for various performance factors including the first gear ratio and/or internal friction of the first motor. Further, line 702 is shown symmetric about the origin of graph 700. However, in some embodiments, line 702 may be asymmetric.

Dashed lines 704a and 704b represent torque magnitude thresholds. In some embodiments, the torque magnitude thresholds 704a and 704b may be equal in magnitude but opposite in direction (e.g., 704a=−704b). In other embodiments, the torque magnitude thresholds 704a and 704b may have different magnitudes. Dotted lines 706a and 706b as well as dotted and arrowed lines 708a and 708b represent a relationship between the torque commanded to the output shaft of the transmission or the torque commanded to the first motor and an output torque produced by the second motor.

Specifically, when a magnitude of the first torque of the output shaft (or, alternatively, a magnitude of the torque of the first motor) exceeds the first threshold torque magnitude (704a or 704b), a second torque (706a or 706b, respectively) may be commanded to the second motor. Specifically, focusing on the upper right quadrant of graph 700, when an output torque of line 702 exceeds threshold torque magnitude 704a, the second motor may be commanded to apply a torque represented by line portion 706a. Similarly, focusing on the lower left quadrant of graph 700, when an output torque of line 702 exceeds threshold torque magnitude 704b, the second motor may be commanded to apply a torque represented by line portion 706b. Magnitude is herein used to mean an absolute value of a quantity. Thus, although graphically line 702 appears to go below threshold 704b (as opposed to exceeding or going above threshold 704b), the magnitude of line 702 exceeds the threshold 704b when line 702 is below threshold 704b.

When a command to change a direction of rotation of the output shaft is received, the second motor may be caused to continue applying the same torque that the second motor is currently applying. Namely, as line 702 crosses the horizontal axis (indicating a change of direction), a direction and magnitude of the torque commanded to the second motor is kept unchanged (until line 702 exceeds either threshold 704a or 704b). Specifically, as line 702 crosses the horizontal axis from the bottom left quadrant to the top right quadrant, torque 706b of the second motor is kept constant, as indicated by dashed and dotted line portion 708b. Similarly, as line 702 crosses the horizontal axis from the top right quadrant to the bottom left quadrant, torque 706a of the second motor is kept constant, as indicated by dashed and dotted line portion 708a. The concept of maintaining the torque of the second motor as the direction of the output shaft is commanded to change may be referred to as hysteresis. In particular, line sections 706a 706b, 708a, and 708b may collectively represent the hysteresis curve of the second motor.

The hysteresis behavior described and illustrated in FIG. 7 allows the second motor to be preloaded to, in response to a command to change a direction of rotation of the output shaft, immediately drive the output shaft in the new direction, thereby driving the transmission through the second portion of the extent of backlash deadband. The torque with which the second motor is preloaded (e.g., torque 706a or 706b) may be opposite in direction and smaller in magnitude than a torque applied to the output shaft by the first motors. Thus, the torque of the first motor may overpower the torque of the second motor, resulting in a net torque applied to the output shaft having the same direction of rotation as the torque applied to the output shaft by the first motor.

Figure 8:
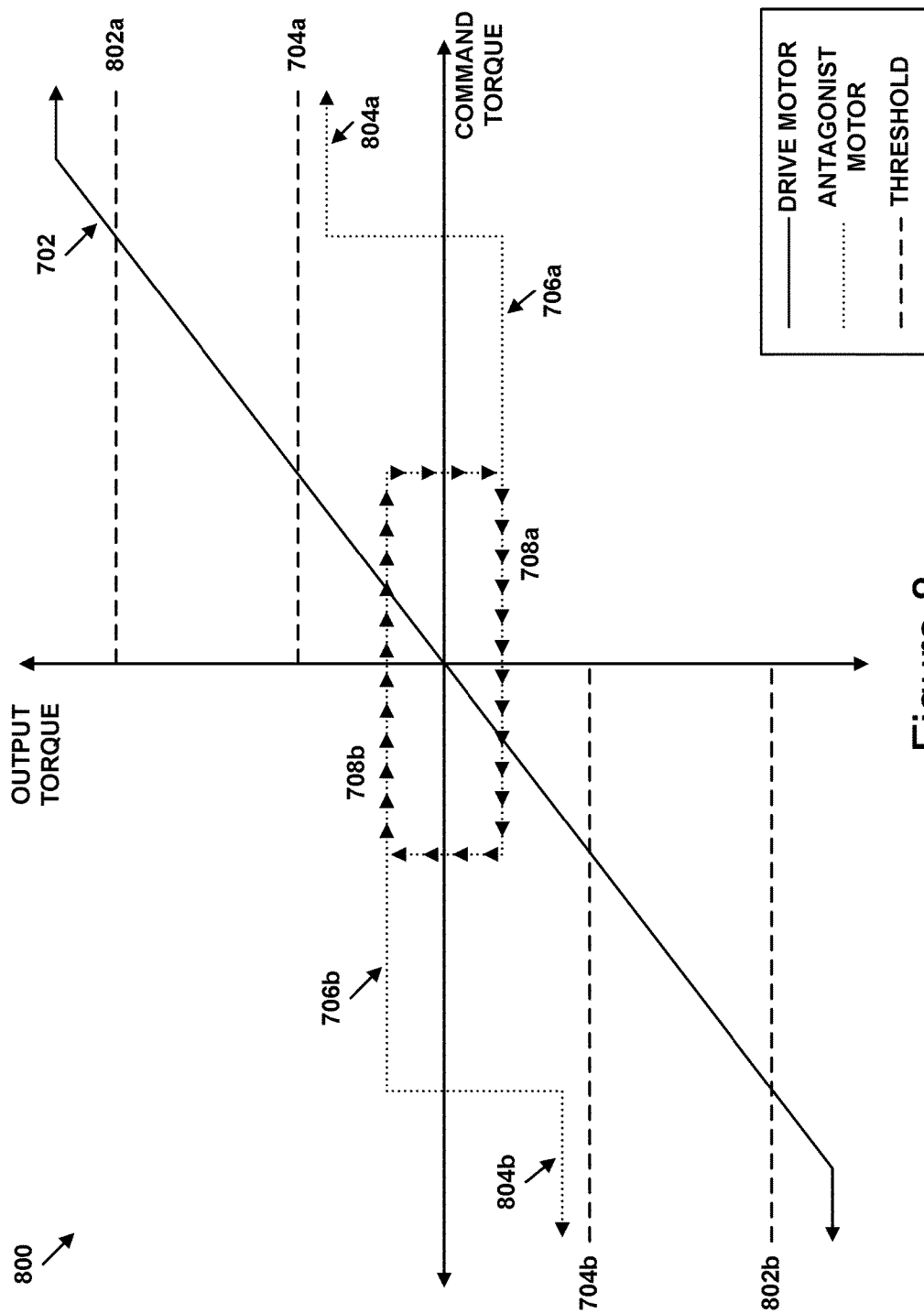
FIG. 8 illustrates another example torque curve, according to an example embodiment.

FIG. 8 illustrates additional operations of the second motor (e.g., antagonist motor 406 of FIG. 4A) that may be used to manage, reduce, or eliminate the backlash deadband of a transmission. Specifically, FIG. 8 illustrates graph 800 representing an augmented version of graph 700 of FIG. 7. Graph 800 shows two additional torque magnitude thresholds 802a and 802b (e.g., second threshold torque magnitudes). A magnitude of torque thresholds 802a and 802b may be greater than a magnitude of torque thresholds 704a and 704b, respectively. When a torque magnitude of line 702 exceeds the torque magnitude thresholds 802a and 802b, the second motor may be caused to apply a torque to the output shaft of the transmission in the same direction as the first motor.

Focusing on the upper right hand quadrant of graph 800, when a torque magnitude of the output shaft (or, alternatively, a magnitude of the torque of the first motor) exceeds the second threshold torque magnitude (802a or 802b), the torque of the second motor may be commended to change from torque 706a or 706b to torque 804a or 804b, respectively. In other words, when a torque applied to a load by the output shaft of the transmission rises in magnitude above a second threshold value, the second motor may be commanded to apply to the output shaft a torque in the same direction as the first motor. Thus, the first motor and the second motor may drive the output shaft in the same direction, resulting in an increased maximum torque that can be applied to the load by the output shaft of the transmission.

When the torque magnitude of the line 702 drops below the second threshold magnitude 802a or 802b and remains above the first threshold torque magnitude 704a or 704b, respectively, the second motor may be commanded to again apply torque 706a or 706b, respectively. When the torque further drops below the first threshold 704a or 704b, the second motor may follow the hysteresis curve as described with respect to FIG. 7. Accordingly, at high loads (e.g., output torque greater than threshold 802a/802b), the first and second motors may work together to drive the output shaft in the same direction. At moderate to low loads, the first and second motors may oppose each other to preload the second motor to bias the transmission to the first motor when a direction of rotation of the output shaft is changed. During direction reversal of rotation of the output shaft, the preloaded second motor may drive the transmission through a greater portion (e.g., the second portion) of the extent of backlash deadband than the first motor. The second portion may be greater due to the second gear ratio being smaller than the first gear ratio and due to the preloading condition of the second motor.

Although line sections 804a and 804b are illustrated as flat, horizontal lines indicating a constant torque, the line sections may alternatively be sloped to command the second motor to apply an increasingly larger torque as the command torque for the first motor or the output shaft increases.

In some embodiments, the line sections 706a, 706b, 708a, and 708b may correspond to a minimum torque that the second motor may apply to rotate the transmission through the extent of backlash. In one example, the minimum torque may be a torque needed to overcome the internal friction/stiction of the transmission. In another example, the minimum torque may be a torque needed to overcome the internal friction/stiction of the transmission and drive a load on the output shaft of the transmission. The magnitude of the torque corresponding to line sections 706a, 706b, 708a, and 708b may be varied depending on the load on the output shaft of the transmission. Specifically, when the load is high, the second motor may apply a higher torque to ensure that sufficient torque is provided upon direction reversal to actuate the load and thus drive the transmission through the extent of backlash deadband.

The second gear ratio may be chosen based on an anticipated load on the output of the transmission. The gear ratio may be chosen to allow the second motor to actuate the load through the second gear ratio without stalling the second motor or back-driving the second motor in reverse. Accordingly, driving the output shaft with the second motor may manage the backlash deadband of a transmission in at least two ways. First, the second motor may bias the transmission to the first motor to allow the first motor to drive the load through the transmission. Second, the second motor may drive the load on the output shaft in the desired direction before the transmission is biased to the first motor. Thus, although the first motor is not yet able to apply a torque to the load due to the backlash deadband, the second motor, due to the second gear ratio smaller than the first gear ratio, might already be driving the load in the desired direction. A gear ratio of 10:1 between the first motor and the second motor may allow the second motor to respond approximately (accounting for vibrations and inertia) ten times faster than the first motor. Thus, the second portion of the extent of backlash deadband traversed by the second motor through the second gear ratio may be at least ten times greater than the first extent of backlash deadband traversed by the first motor through the first gear ratio.

Figure 9:
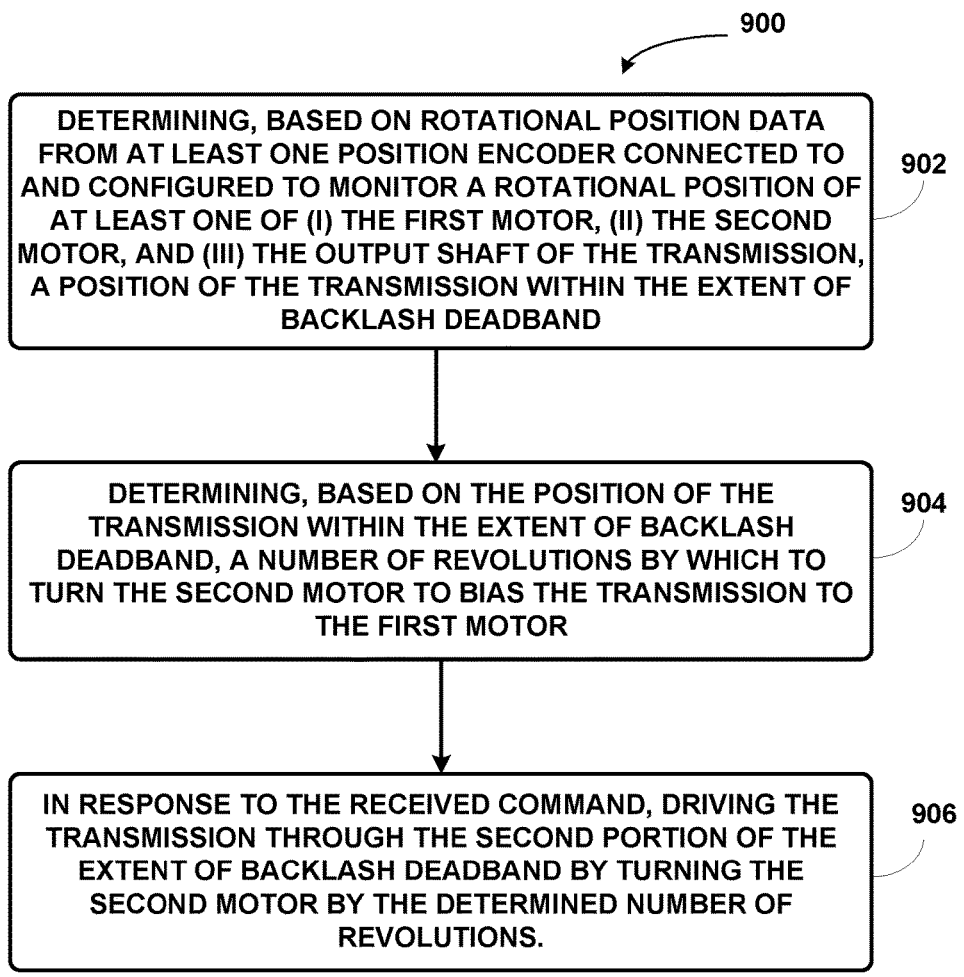
FIG. 9 illustrates further example operations for managing backlash, according to an example embodiment.

FIG. 9 illustrates a position-based approach that may additionally or alternatively be used to manage, reduce, or eliminate the extent of backlash deadband of a transmission. Specifically, in block 902 of flow diagram 900, a control system may determine, based on rotational position data from at least one position encoder connected to and configured to monitor a rotational position of at least one of (i) the first motor, (ii) the second motor, and (iii) the output shaft of the transmission, a position of the transmission within the extent of backlash deadband. The at least one position encoder may be part of sensors 402, 408, and 414, as illustrated in FIG. 4A.

In some embodiments, the extent of backlash deadband may be programmed or provided to the control system by user, operator, or designer of a robotic device or mechanical system utilizing the transmission with the extent of backlash deadband. In other embodiments, the control system may be configured to dynamically determine the extent of backlash deadband of the transmission. An example system may include a first position encoder connected to the first motor and a second position encoder connected to the output shaft of the transmission. The extent of backlash deadband may be determined based on rotational position data from the first encoder and the second encoder. For example, with the transmission biased to the first motor in a first direction, the control system may be configured to command the first motor to turn in a second, opposite direction. The control system may count the number of counts of the first encoder of the first motor until the second encoder on the output of the transmission indicates that motion of the input shaft is being transferred to the output shaft (the transmission is biased in the second, opposite direction).

For example, with reference to FIGS. 3A, 3B, and 3C, an encoder of a motor connected to gear 302 may start measuring the extent of backlash deadband based on the encoder data when gears 300 and 302 are in the position/orientation shown in FIG. 3A. When gears 300 and 302 move through the extent of backlash deadband and reach the position/orientation shown in FIG. 3C, the control system may determine that the extent of backlash is the gap 316 and/or 318. The gap 316 and/or 318 may correspond to a specific number of encoder counts.

When, at a future time, gears 300 and 302 reach the position/orientation illustrated in FIG. 3B, the control system may determine, based on encoder data, that gear 302 still needs to clear gap 324 in order to traverse the extent of backlash deadband 318. Likewise, the control system may determine that gap 322 has already been cleared in traversing the extent of backlash 316. The position of the transmission within the extent of deadband may be based on the extent of backlash deadband already cleared and the extent of backlash deadband remaining to be cleared (e.g., gaps 322 and 324, respectively, when the transmission consists of gears 300 and 302).

The number of encoder counts counted by the control system may represent the extent of backlash deadband of the transmission. The encoder counts may be converted to angular displacement or number of rotations based on properties associated with the first encoder (e.g., first encoder may produce 64 counts per rotation of the first motor, thus each count may represent 0.098 radians). The same procedure may be repeated between the second encoder of the second motor to model any backlash deadband of the second plurality of gears. With the total extent of backlash of the first plurality of gears of the transmission and the second plurality of gears known, the control system may use position data from the first encoder and the second encoder to determine a position of the transmission within the extent of backlash deadband.

In another example embodiment, a first position encoder may be connected to the first motor, a second position encoder may be connected to the second motor, and a third position encoder may be connected to the output shaft of the transmission. The operations described herein may be adapted to utilize data from all three position encoders to determine the extent of backlash of the transmission and determine the position of the transmission within the extent of backlash deadband. In general, any combination of the first position encoder, the second position encoder, and the third position encoder may be utilized to perform the operations herein described.

In block 904, the control system may determine, based on the position of the transmission within the extent of backlash deadband, a number of revolutions by which to turn the second motor to bias the transmission to the first motor. The number of revolutions may further be based on the second gear ratio. The control system may further determine a motor torque profile for the second motor to follow as the second motor turns by the determined number of revolutions. The determined motor torque profile may indicate to cause the second motor to decrease a rotational speed of the motor before completely biasing the transmission to the first motor to reduce a force of impact between the first plurality of gears of the transmission. Reducing the force of impact may reduce wear and tear on the transmission, the first motor, and the second motor and therefore increase a usable lifetime of the system.

In block 906, in response to the received command, the transmission may be driven through the second portion of the extent of backlash deadband by turning the second motor by the determined number of revolutions. The second motor may additionally be caused to follow the determined torque profile as the second motor turns by the determined number of revolutions.

VI. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
 a transmission comprising an input shaft, an output shaft, and a first plurality of gears configured to transfer motion of the input shaft to the output shaft, and wherein the transmission has an extent of backlash deadband;
 a first motor connected to the input shaft of the transmission;
 a second motor connected to the output shaft of the transmission through a second plurality of gears, wherein a first gear ratio of the first plurality of gears is greater than a second gear ratio of the second plurality of gears; and
 a control system configured to:
  receive a command to change a direction of rotation of the output shaft from a first direction to a second direction opposite to the first direction;
  in response to the received command, drive the transmission through a first portion of the extent of backlash deadband by driving the input shaft with the first motor to drive the output shaft in the second direction through the first gear ratio; and
  drive the transmission through a second portion of the extent of backlash deadband by driving the output shaft in the second direction through the second gear ratio with the second motor to bias the transmission to the first motor, wherein the second portion is greater than the first portion.

2. The system of claim 1 wherein a sum of the first portion of the extent of backlash deadband and the second portion of the extent of backlash deadband is approximately equal to the extent of backlash deadband of the transmission.

3. The system of claim 1, wherein the second motor is connected directly to the output shaft of the transmission through a first gear on the output shaft of the transmission meshing with a second gear on a shaft of the second motor, and wherein the second plurality of gears comprises the first gear and the second gear.

4. The system of claim 1, wherein:
 the first plurality of gears includes a first number of gears;
 the second plurality of gears includes a second number of gears; and
 the first number of gears is greater than the second number of gears.

5. The system of claim 1, wherein:
 the first motor and the second motor have a same size; and
 a ratio of the first gear ratio to the second gear ratio is about 10:1, thereby allowing the second motor to drive the transmission through a given portion of the extent of backlash deadband about ten times faster than the first motor.

6. The system of claim 1, wherein the control system is further configured to:
 provide instructions to drive the input shaft with the first motor to drive the output shaft with a first torque having the first direction;
 when a magnitude of the first torque of the output shaft exceeds a first threshold torque magnitude, provide instructions to drive, with the second motor, the output shaft with a second torque having the second direction, wherein a magnitude of the second torque is smaller than the magnitude of the first torque, thereby driving the output shaft with a net torque in the first direction; and
 in response to the received command, drive the transmission through the second portion of the extent of backlash deadband by continuing to drive, with the second motor, the output shaft with the second torque having the second direction.

7. The system of claim 6, wherein the control system is further configured to:
 when a magnitude of the first torque of the output shaft exceeds a second threshold torque magnitude greater than the first threshold torque magnitude, provide instructions to drive, with the second motor, the output shaft with a third torque having the first direction and a magnitude different from the magnitude of the second torque, thereby causing the first motor and the second motor to drive the output shaft in the first direction; and
 when a magnitude of the first torque of the output shaft falls below the second threshold torque magnitude, provide instructions to drive, with the second motor, the output shaft with the second torque having the second direction.

8. The system of claim 6, wherein the received command is a first received command, and wherein the control system is further configured to:
 in response to the first received command, provide instructions to drive the input shaft with the first motor to drive the output shaft with a third torque having the second direction and a magnitude different from the magnitude of the first torque;
 when the magnitude of the third torque of the output shaft exceeds a second threshold torque magnitude, provide instructions to drive, with the second motor, the output shaft with a fourth torque having the first direction, wherein a magnitude of the fourth torque is smaller than the magnitude of the third torque, thereby driving the output shaft with a net torque in the second direction;
 receive a second command to change a direction of rotation of the output shaft from the second direction to the first direction;
 in response to the second received command, provide instructions to drive the transmission through the first portion of the extent of backlash deadband by driving the input shaft with the first motor to drive the output shaft in the first direction through the first gear ratio; and provide instructions to drive the transmission through the second portion of the extent of backlash deadband by driving the output shaft in the first direction through the second gear ratio with the second motor to bias the transmission to the first motor.

9. The system of claim 1, wherein a rotational position of the second motor is monitored by a position encoder connected to the second motor, and wherein the control system is further configured to:

determine, based on data from the position encoder and a motor current of the second motor, a minimum torque magnitude for driving the transmission through the extent of backlash deadband by the second motor through the second gear ratio; and provide instructions to drive the transmission through the second portion of the extent of backlash deadband by driving the output shaft with the determined minimum torque in the second direction by the second motor through the second gear ratio.

10. The system of claim 1, wherein at least one position encoder is connected to and configured to monitor a rotational position of at least one of (i) the first motor, (ii) the second motor, and (iii) the output shaft of the transmission, and wherein the control system is further configured to:

determine, based on rotational position data from the at least one position encoder, a position of the transmission within the extent of backlash deadband;

determine, based on the position of the transmission within the extent of backlash deadband, a number of revolutions by which to turn the second motor to bias the transmission to the first motor; and in response to the received command, provide instructions to drive the transmission through the second portion of the extent of backlash deadband by turning the second motor by the determined number of revolutions.

11. The system of claim 10, wherein the control system is further configured to:

determine, based on the rotational position data from the at least one position encoder, the extent of backlash deadband of the transmission.

12. The system of claim 10, wherein the control system is further configured to:

determine, based on the position of the transmission within the extent of backlash deadband, a motor torque profile for the second motor to follow as the second motor turns by the determined number of revolutions, wherein the motor torque profile indicates to cause the second motor to decrease a rotational speed of the motor before completely biasing the transmission to the first motor to reduce a force of impact between the first plurality of gears of the transmission.

13. The system of claim 1, wherein the output shaft of the transmission is configured to actuate an end effector of a robotic device, and wherein the control system is further configured to:

provide instructions to drive the input shaft with the first motor to drive the output shaft to position the end effector of the robotic device in a particular position.

14. The system of claim 1, wherein the transmission is a planetary gear transmission, and wherein axes of rotation of at least a portion of the gears of the first plurality of gears move relative to an axis of rotation the output shaft.

15. The system of claim 1, wherein the transmission is a compound spur gear transmission, and wherein axes of rotation of each of the gears of the first plurality of gears are fixed relative to an axis of rotation of the output shaft.

16. A method comprising:

receiving a command to change a direction of rotation of an output shaft of a transmission from a first direction to a second direction opposite to the first direction, wherein the transmission comprises an input shaft, the output shaft, and a first plurality of gears having a first gear ratio, wherein the first plurality of gears is configured to transfer motion of the input shaft to the output shaft, and wherein the transmission has an extent of backlash deadband;

in response to the received command, driving the transmission through a first portion of the extent of backlash deadband by driving the input shaft with a first motor to drive the output shaft in the second direction through the first gear ratio, wherein the first motor is connected to the input shaft; and driving the transmission through a second portion of the extent of backlash deadband by driving the output shaft in the second direction through a second gear ratio with a second motor to bias the transmission to the first motor, wherein the second motor is connected to the output shaft of the transmission through a second plurality of gears having the second gear ratio, wherein the second gear ratio is smaller than the first gear ratio, and wherein the second portion is greater than the first portion.

17. The method of claim 16, wherein the second motor is connected directly to the output shaft of the transmission through a first gear on the output shaft of the transmission meshing with a second gear on a shaft of the second motor, wherein the second plurality of gears comprises the first gear and the second gear.

18. The method of claim 16, further comprising:

driving the input shaft of the transmission with the first motor to drive the output shaft with a first torque having the first direction;

when a magnitude of the first torque of the output shaft exceeds a first threshold torque magnitude, driving, with the second motor, the output shaft with a second torque having the second direction, wherein a magnitude of the second torque is smaller than the magnitude of the first torque, thereby driving the output shaft with a net torque in the first direction; and in response to the received command, driving the transmission through the second portion of the extent of backlash deadband by continuing to drive, with the second motor, the output shaft with the second torque having the second direction.

19. The method of claim 18, further comprising:

when a magnitude of the first torque of the output shaft exceeds a second threshold torque magnitude greater than the first threshold torque magnitude, driving, with the second motor, the output shaft with a third torque having the first direction and a magnitude different from the magnitude of the second torque, thereby causing the first motor and the second motor to drive the output shaft in the first direction; and when a magnitude of the first torque of the output shaft falls below the second threshold torque magnitude, driving, with the second motor, the output shaft with the second torque having the second direction.

20. A non-transitory computer readable storage medium having stored thereon instructions that, when executed by a computing device, cause the computing device to perform operations comprising:

receiving a command to change a direction of rotation of an output shaft of a transmission from a first direction to a second direction opposite to the first direction, wherein the transmission comprises an input shaft, the output shaft, and a first plurality of gears having a first gear ratio, wherein the first plurality of gears is configured to transfer motion of the input shaft to the output shaft, and wherein the transmission has an extent of backlash deadband;

in response to the received command, driving the transmission through a first portion of the extent of backlash deadband by driving the input shaft with a first motor to drive the output shaft in the second direction through the first gear ratio; and driving the transmission through a second portion of the extent of backlash deadband by driving the output shaft in the second direction through a second gear ratio with a second motor to bias the transmission to the first motor, wherein the second motor is connected to the output shaft of the transmission through a second plurality of gears having the second gear ratio, wherein the second gear ratio is smaller than the first gear ratio, and wherein the second portion is greater than the first portion.

* * * * *